(12) United States Patent
Tokuchi

(10) Patent No.: US 10,715,694 B2
(45) Date of Patent: Jul. 14, 2020

(54) IMAGE FORMING INSTRUCTION DEVICE, IMAGE FORMING INSTRUCTION METHOD, AND NON-TRANSITORY COMPUTER READABLE MEDIUM FOR BORDERLESS AND NON-BORDERLESS PRINTING

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/984,425

(22) Filed: May 21, 2018

(65) Prior Publication Data

US 2019/0089847 A1 Mar. 21, 2019

(30) Foreign Application Priority Data

Sep. 15, 2017 (JP) ................................. 2017-177495

(51) Int. Cl.
*H04N 1/00* (2006.01)
*H04N 1/409* (2006.01)
*G06F 3/12* (2006.01)
*H04N 1/38* (2006.01)

(52) U.S. Cl.
CPC ......... *H04N 1/0066* (2013.01); *G06F 3/1219* (2013.01); *G06F 3/1256* (2013.01); *H04N 1/0044* (2013.01); *H04N 1/38* (2013.01); *H04N 1/4092* (2013.01)

(58) Field of Classification Search
None
See application file for complete search history.

(56) References Cited

U.S. PATENT DOCUMENTS

| | | | | |
|---|---|---|---|---|
| 4,546,449 A * | 10/1985 | Masaki | ...................... | B41J 5/46 358/1.18 |
| 4,941,017 A * | 7/1990 | Mishima | ............ | G03G 15/5095 399/193 |
| 8,768,307 B1 * | 7/2014 | Heins | ...................... | H04L 51/16 455/412.1 |
| 2006/0221369 A1 * | 10/2006 | Inoue | .................... | G06F 3/1204 358/1.13 |
| 2011/0072351 A1 * | 3/2011 | Shintani | .............. | G06F 3/04817 715/730 |
| 2013/0194621 A1 * | 8/2013 | Sweet | ................ | G06K 15/4005 358/1.15 |
| 2015/0002862 A1 * | 1/2015 | Maeda | ................... | B41J 11/008 358/1.2 |
| 2016/0124691 A1 * | 5/2016 | Nouda | .................. | G06F 3/1256 358/1.18 |

FOREIGN PATENT DOCUMENTS

| | | |
|---|---|---|
| JP | 2008089657 | 4/2008 |
| JP | 2008090671 | 4/2008 |
| JP | 2017010089 | 1/2017 |
| JP | 6108022 | 4/2017 |

\* cited by examiner

*Primary Examiner* — Andrew H Lam
(74) *Attorney, Agent, or Firm* — JCIPRNET

(57) ABSTRACT

An image forming instruction device includes a selector that selects either a setting for borderless printing or a setting for non-borderless printing based on print data. In a further modification of the invention, the selector may select either the setting for borderless printing or the setting for non-borderless printing based on an image on an outer edge of the print data.

12 Claims, 25 Drawing Sheets

FIG.8

| PRINT INSTRUCTION | PRINT DATA | PAPER SIZE | PRINT ORIENTATION | NUMBER OF COPIES | BORDERLESS PRINTING | | | | ... |
|---|---|---|---|---|---|---|---|---|---|
| 810 | 820 | 830 | 840 | 850 | UPPER SIDE | RIGHT SIDE | LOWER SIDE | LEFT SIDE | |
| | | | | | 862 | 864 | 866 | 868 | |

800, 860

IMAGE FORMING INSTRUCTION DEVICE, IMAGE FORMING INSTRUCTION METHOD, AND NON-TRANSITORY COMPUTER READABLE MEDIUM FOR BORDERLESS AND NON-BORDERLESS PRINTING

CROSS-REFERENCE TO RELATED APPLICATIONS

This application is based on and claims priority under 35 USC 119 from Japanese Patent Application No. 2017-177495 filed Apr. Sep. 15, 2017.

BACKGROUND

Technical Field

The present invention relates to an image forming instruction device, an image forming instruction method, and a non-transitory computer readable medium.

SUMMARY

According to an aspect of the invention, an image forming instruction device includes a selector that selects either a setting for borderless printing or a setting for non-borderless printing based on print data.

BRIEF DESCRIPTION OF THE DRAWINGS

Exemplary embodiments of the present invention will be described in detail based on the following figures, wherein:

FIG. 8 is an explanatory view illustrating an example of a data structure of a print instruction table;

DETAILED DESCRIPTION

Hereinafter, an exemplary embodiment suitable for implementation of the present invention will be described with reference to the accompanying drawings.

Figure 1:
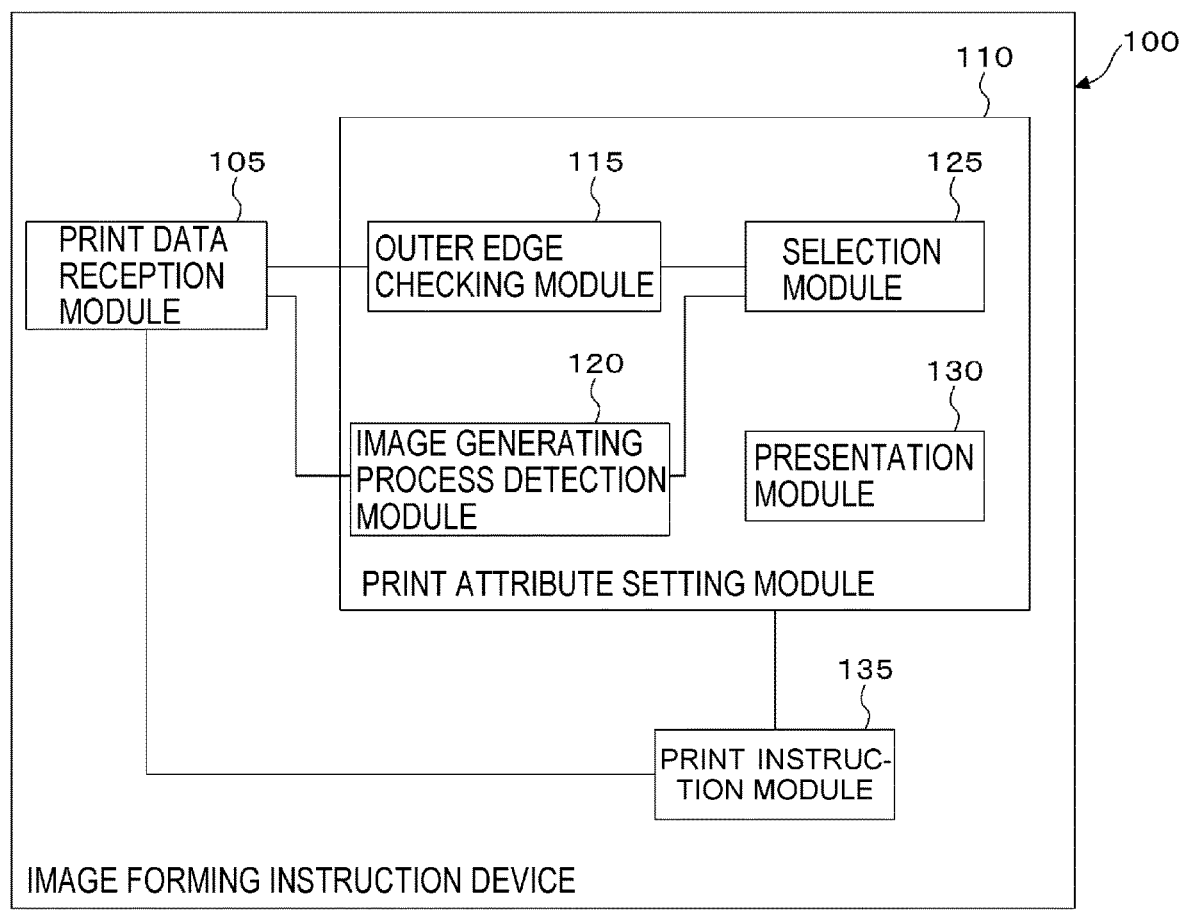
FIG. 1 is a conceptual module configuration diagram of a configuration example of an exemplary embodiment.

FIG. 1 is a conceptual module configuration diagram of a configuration example of an exemplary embodiment.

As used herein, the term "module" generally refers to a component such as software (computer program), hardware or the like that can be logically separated. Therefore, a module in this exemplary embodiment refers to not only a module for a computer program but also a module for a hardware configuration. Therefore, in this exemplary embodiment, a computer program for causing a computer to function as a module (a program for causing a computer to execute each procedure, a program for causing a computer to function as each unit, and a program for causing a computer to implement each function), a system and a method will be described. As used herein, the term "store,", "stored" or an equivalent wording refers to storing in a storage device or controlling to store in a storage device when an exemplary embodiment is directed to a computer program. In addition, although modules may be in the one-to-one correspondence with functions, in implementation, one module may be configured as one program, or plural modules may be configured as one program, or conversely, one module may be configured as plural programs. Further, plural modules may be executed by one computer, or one module may be executed by plural computers in a distributed or parallel environment. Further, one module may include other modules. As used herein, the term "connection" is intended to include not only a physical connection but also a logical connection (data exchange, instruction, reference relation between data, log-in, etc.). As used herein, the term "predetermined" refers to that an object is determined before a targeted process. Specifically, it includes the meaning that an object is determined not only before a process according to the present exemplary embodiment starts, but also before a targeted process even after the process according to the present exemplary embodiment starts, according to the situation/state at that time or according to the situation/state so far. When there are plural "predetermined values", they may be different values or may be two or more identical values (including the case where all the values are an identical value). In addition, a statement "do B when A" is used to mean "determine whether or not A is met and do B when it is determined that A is met." However, cases where it is unnecessary to determine whether or not A is met are excluded. Further, when enumerating objects like "A, B, C," etc., it is an example enumeration unless otherwise mentioned, including a case where only one of them is selected (e.g., only A only).

As used herein, the term "system or apparatus" is intended to include not only plural computers, hardware, devices and the like connected by a communication unit such as a network (including a one-to-one correspondence communication connection) or the like, but also a single computer, hardware and the like. The "device" and the "system" are used synonymously with each other. Of course, the "system" does not include things that are merely a social "structure" (social system) which is an artificial agreement.

In addition, for each process by each module or for each process when plural processes are performed in the module, target information is read from a storage device, the process is performed and then a result of the process is written in the storage device. Therefore, the description about reading from the storage device before processing and writing to the storage device after the processing may be omitted in some cases. The storage device used here may include a hard disk, a RAM (Random Access Memory), an external storage medium, a storage device via a communication line, a register in a CPU (Central Processing Unit), and the like.

An image forming instruction device 100 according to the present exemplary embodiment is one to designate one of borderless printing and non-borderless printing (so-called border printing) for an image forming device 200 capable of performing both of the borderless printing and the non-borderless printing. As illustrated in FIG. 1, the image forming instruction device 100 includes a print data reception module 105, a print attribute setting module 110 and a print instruction module 135.

For example, in a case where there are a borderless printing mode (setting) and a non-borderless printing mode (setting), if a user sets one of the modes each time printing is performed, the number of work steps increases to take time and labor for operation. Therefore, in order to save time and labor, the image forming instruction device 100 determines which one of the borderless printing mode and the non-borderless printing mode is more effective setting, and preferentially sets the mode according to the determination result.

The print data reception module 105 is connected to an outer edge checking module 115 and an image generating process detection module 120 of the print attribute setting module 110, and the print instruction module 135. The print data reception module 105 receives print data to be printed by the image forming device 200 and passes the print data to the outer edge checking module 115, the image generating process detection module 120 and the print instruction module 135. The phase "receiving print data" used herein is meant to include, for example, reading an image with a scanner, a camera or the like, receiving an image from an external device via a communication line with a facsimile or the like, reading out an image stored in a hard disk (including one connected to the image forming instruction device 100 via a communication line and one built in the image forming instruction device 100) or the like, etc. The print data may be either a binary image or a multivalued image (including a color image). The number of print data received may be one or more. Further, the contents of print data may include a document used for business, a pamphlet for advertisement promotion, or the like.

The print attribute setting module 110 includes the outer edge checking module 115, the image generating process detection module 120, a selection module 125 and a presentation module 130 and is connected to the print instruction module 135. The print attribute setting module 110 is one to set a print attribute in a case where the image forming device 200 is caused to perform printing, and for example, one to set either the borderless printing or the non-borderless printing as a print attribute. Further, the print attribute setting module 110 determines whether or not the image forming device 200 can be set to both of the borderless printing and the non-borderless printing. If both can be set, the print attribute setting module 110 causes each module in the print attribute setting module 110 to perform a process. If cannot (e.g., if the image forming device 200 can perform only one of the borderless printing and the non-borderless printing), the setting of the print attributes (e.g., the number of copies to be printed, paper size, monochrome/color printing, etc.) in a general printing device may be set.

The outer edge checking module 115 is connected to the print data reception module 105 and the selection module 125. The outer edge checking module 115 checks whether or not there is an image to be printed on the outer edge of the print data received by the print data reception module 105. The term "outer edge of the print data" used herein refers to a peripheral portion of the print data, which corresponds to an edge of a medium when the print data is printed on the medium. That is, it is determined by the positional relationship between the area of the print data and the medium on which it is printed.

The area of the print data need not be limited to a rectangle, but when it is a rectangle, the outer edge is the edge portion of four sides of the rectangle. The following description will be given with a rectangle as an example. Specifically, the following description will be made using the example of FIGS. 5A to 5C. Further, the term "medium" used herein is meant to include one on which printing is performed (one onto which print data is transferred), such as paper, resin, or cloth, which is generally referred to as a sheet.

The image generating process detection module 120 is connected to the print data reception module 105 and the selection module 125. The image generating process detection module 120 detects a process of generating the print data received by the print data reception module 105. The generating process may include generating print data by taking a screenshot. As a detection method, for example, when an image generating process is included as an attribute of the print data, the image generating process may be extracted. Further, it is not limited to the attribute of the print data but may be extracted from other data or the like. For example, the generating process may be detected from a print data generating operation (e.g., an operation of a finger on a touch panel or an operation of a pointer such as a mouse) from a print data generating device (which may be included in the image forming instruction device 100).

Further, the generating process may be detected from an operation log (operation history) for generating print data.

The selection module 125 is connected to the outer edge checking module 115 and the image generating process detection module 120. The selection module 125 selects either a setting for borderless printing or a setting for non-borderless printing, based on the print data.

In addition, based on an image on the outer edge of the print data, the selection module 125 may select either the setting for borderless printing or the setting for non-borderless printing. The phrase "based on an image on the outer edge of the print data" used herein means a result of detection by the outer edge checking module 115.

Further, when there is an image on the outer edge of the print data, the selection module 125 may select the setting for borderless printing. The phrase "when there is an image on the outer edge of the print data" used herein refers to a case where there is print data to be printed on the outer edge of a medium.

Further, when there is no image on the outer edge of the print data, the selection module 125 may select the setting for non-borderless printing.

In addition, the selection module 125 may select the setting for borderless printing or the setting for non-borderless printing for each edge of the print data. When the print data is rectangular, the selection module 125 may select the setting for borderless printing or the setting for non-borderless printing for each side (each of the four sides).

In addition, the selection module 125 may select one of the setting for borderless printing and the setting for non-borderless printing based on the print data generating process.

Further, when the print data is an image generated by taking a screenshot, the selection module 125 may select the setting for borderless printing. Then, when the print data is generated by a method other than taking a screenshot (e.g., in a case where the print data is a document or the like created by a document creation program), the selection module 125 may select the setting for non-borderless printing.

The presentation module 130 presents the selection result by the selection module 125. As the selection result, there is one of the setting for borderless printing and the setting for non-borderless printing.

In addition, the presentation module 130 may present the selection result by the selection module 125 in such a manner that it can be changed by an operator. Specifically, the operation to change by the operator may include changing the setting for borderless printing, which is the selection result by the selection module 125, to the setting for non-borderless printing and conversely, changing the setting for non-borderless printing, which is the selection result by the selection module 125, to the setting for borderless printing.

The print instruction module 135 is connected to the print data reception module 105 and the print attribute setting module 110. In accordance with the setting of the print attribute by the print attribute setting module 110, the print instruction module 135 generates a print instruction (also referred to as a print job) that causes the image forming device 200 to print the print data received by the print data reception module 105 and passes the print instruction to the image forming device 200.

Further, in a case where the setting for borderless printing and the setting for non-borderless printing are mixed in the print data, the print instruction module 135 may generate an image having a leading edge that is set to the setting for non-borderless printing. When the print data is rectangular, the print instruction module 135 may generate an image having a leading side that is set to the setting for non-borderless printing.

In addition, the print instruction module 135 may rotate the print data so as to generate an image having a leading edge that is set to the setting for non-borderless printing. When the print data is rectangular, the print instruction module 135 may generate an image having a leading side that is set to the setting for non-borderless printing.

Figure 2A:
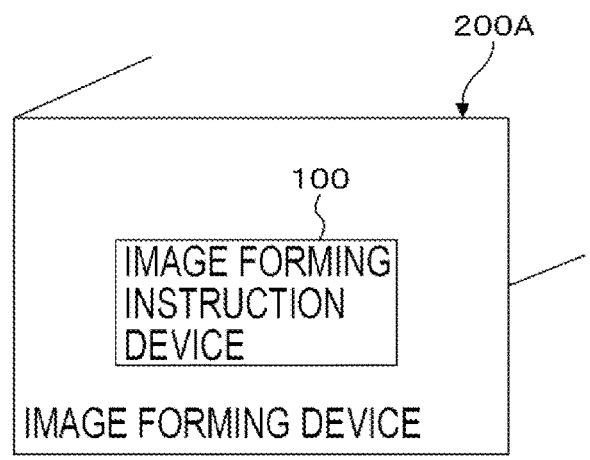
FIGS. 2A and 2B are explanatory views illustrating a system configuration example using the present exemplary embodiment.
Figure 2B:
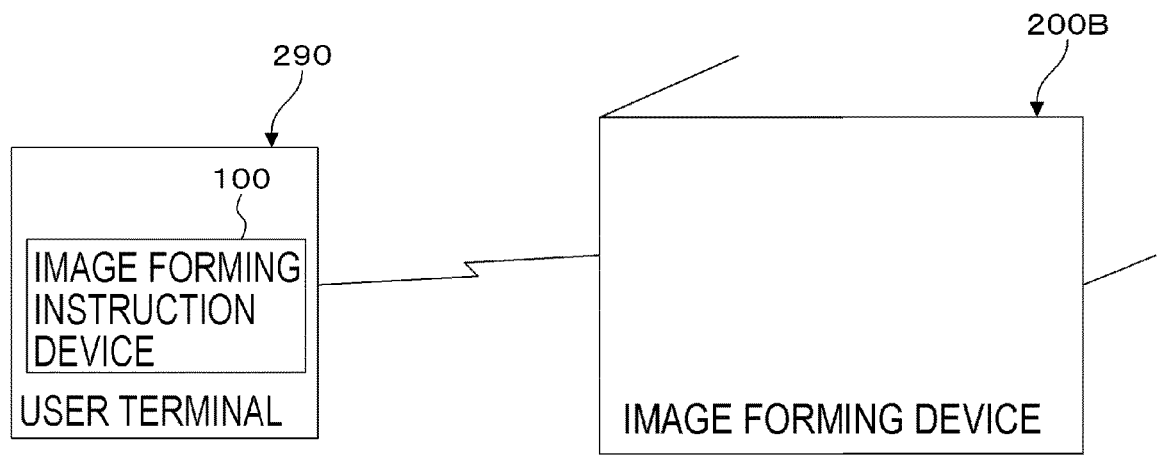

FIGS. 2A and 2B are explanatory views illustrating a system configuration example using the present exemplary embodiment. Here, the image forming device 200 is a printing device capable of performing both of the borderless printing and the non-borderless printing. The image forming device 200 will be described later with reference to FIG. 13 and subsequent figures.

An image forming device 200A illustrated in the example of FIG. 2A includes an image forming instruction device 100. That is, FIG. 2A illustrates a case where the image forming instruction device 100 is incorporated as a part of a control unit of an operation panel of the image forming device 200. The image forming device 200A performs printing in accordance with a print instruction from the image forming instruction device 100.

A user terminal 290 illustrated in the example of FIG. 2B includes an image forming instruction device 100. An image forming device 200B and the user terminal 290 are interconnected via a communication line. Here, the communication line may be wireless, wired or a combination thereof, and examples thereof include the Internet as an infrastructure for communication, an intranet, etc. The user terminal 290 may be, for example, a notebook PC, a portable information communication terminal or the like. The image forming device 200B performs printing in accordance with a print instruction from the user terminal 290.

Figure 3:
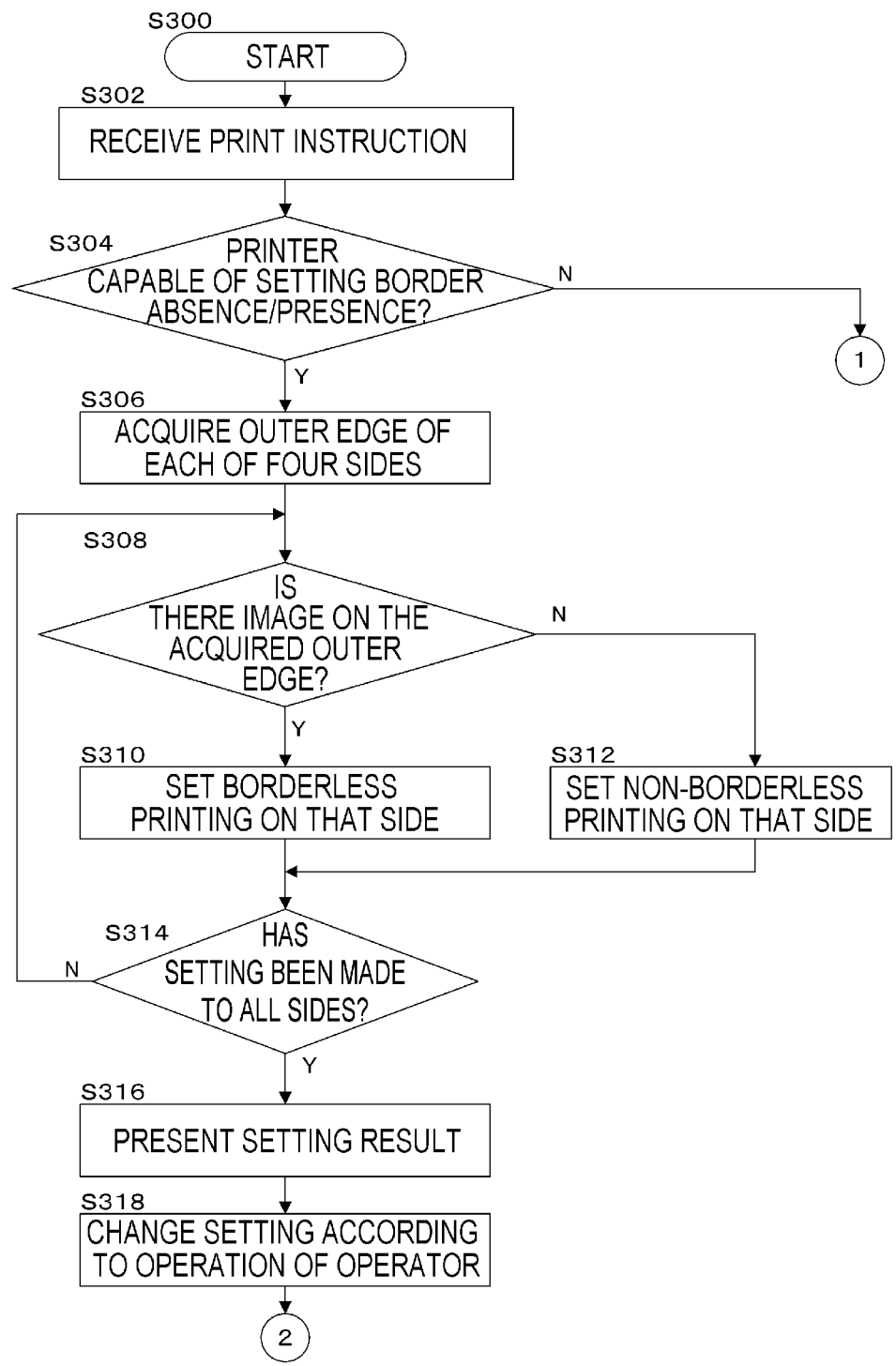
FIG. 3 is a flowchart illustrating an example of a process according to the present exemplary embodiment.
Figure 4:
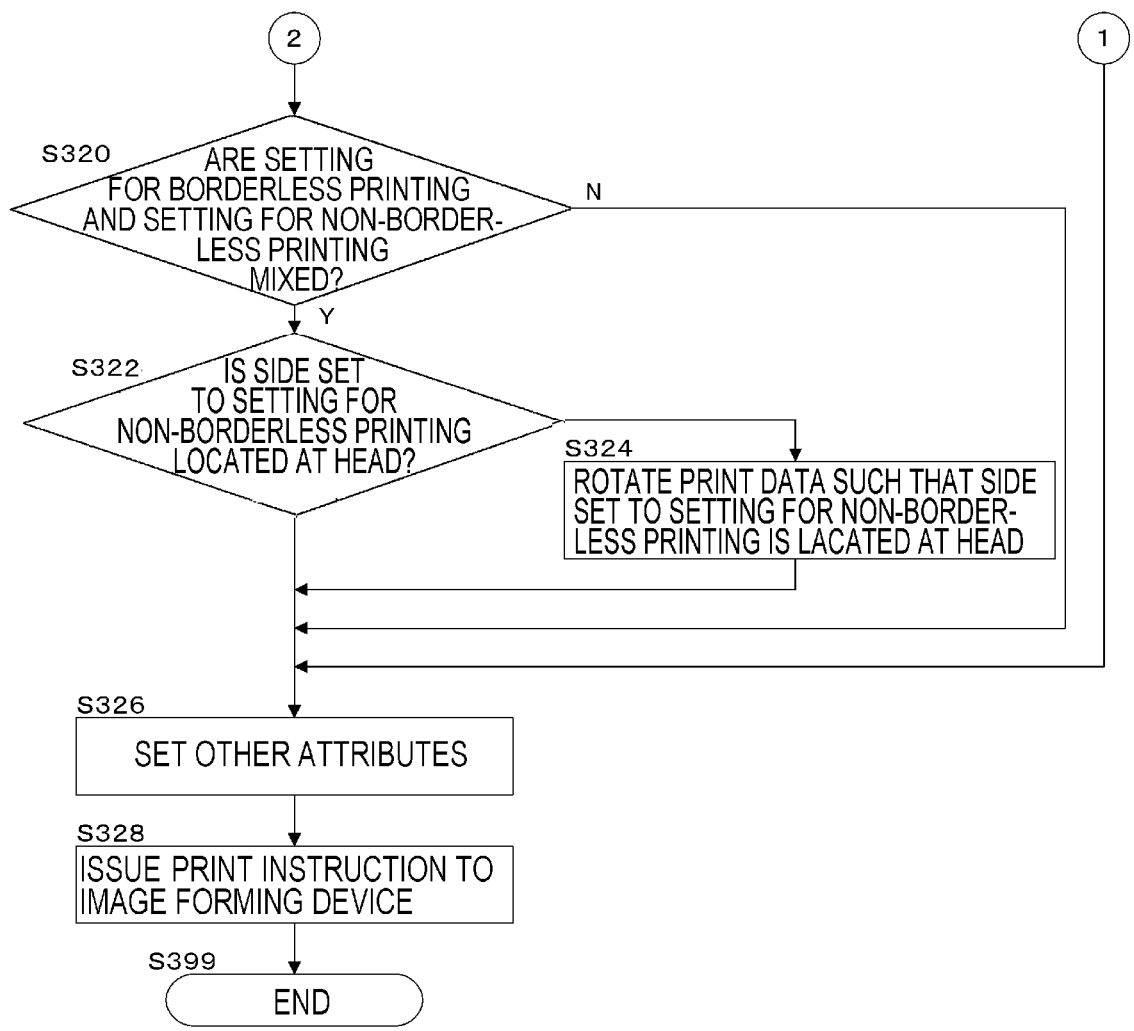
FIG. 4 is a flowchart illustrating an example of a process according to the present exemplary embodiment.

FIGS. 3 and 4 are flowcharts illustrating an example of a process according to the present exemplary embodiment.

In step S302, the print data reception module 105 receives a print instruction.

In step S304, the print attribute setting module 110 determines whether or not an image forming device is a printing device capable of setting border absence/presence (borderless printing/non-borderless printing). When it is determined that the image forming device is a printer capable of setting border absence/presence, the process proceeds to step S306. Otherwise, the process proceeds to step S326.

Figure 5A:
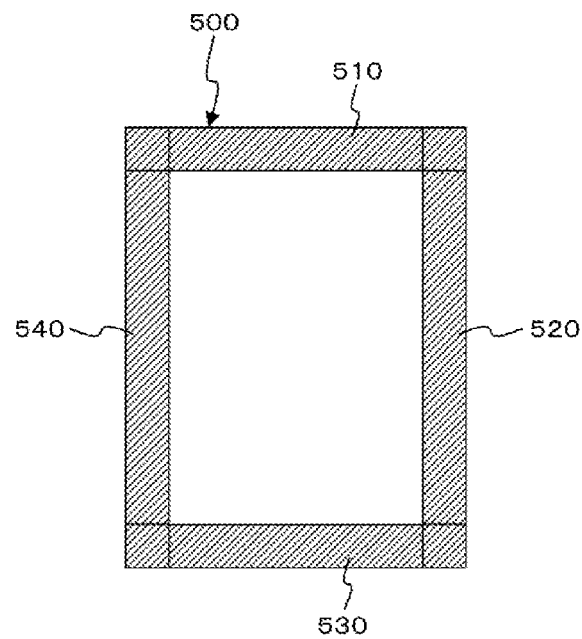
FIGS. 5A to 5C are explanatory views illustrating an example of an outer edge of an object to be processed according to the present exemplary embodiment.
Figure 5B:
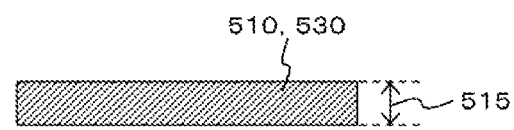
Figure 5C:
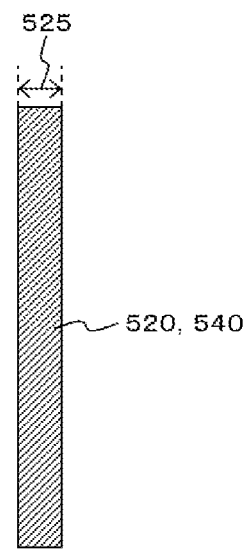

In step S306, the outer edge checking module 115 acquires the outer edge of each of the four sides. For example, FIGS. 5A to 5C are explanatory views illustrating an example of the outer edge of a processing target according to the present exemplary embodiment. As illustrated in the example of FIG. 5A, print data 500 includes an outer edge 510, an outer edge 520, an outer edge 530 and an outer edge 540. As illustrated in the examples of FIGS. 5B and 5C, widths 515 of the outer edge 510 and the outer edge 530 and widths 525 of the outer edge 520 and the outer edge 540 are the widths of edge portions for non-borderless printing. In the example of FIG. 5B, the width 515 of the outer edge 510 and the width 515 of the outer edge 530 are the same, but may have different values. Similarly, in the example of FIG. 5C, the width 525 of the outer edge 520 and the width 525 of the outer edge 540 are the same, but may have different values.

In step S308, the outer edge checking module 115 determines whether or not there is an image on the acquired outer edge. When it is determined that there is an image, the process proceeds to step S310. Otherwise, the process proceeds to step S312. In the example of FIGS. 5A to 5C, it may be determined whether or not there are images to be printed on the outer edge 510, the outer edge 520, the outer edge 530 and the outer edge 540. The outer edge 510, the outer edge 520, the outer edge 530 and the outer edge 540 may be areas in a medium to be printed.

In step S310, the selection module 125 sets the borderless printing on that side.

In step S312, the selection module 125 sets the non-borderless printing on that side.

In step S314, the selection module 125 determines whether or not the setting has been made to all sides. When it is determined that the setting has been made to all sides, the process proceeds to step S316. Otherwise, the process returns to step S308.

In step S316, the presentation module 130 presents the setting result. For example, the presentation module 130 makes presentation as illustrated in FIG. 6 or FIG. 7.

Figure 6:
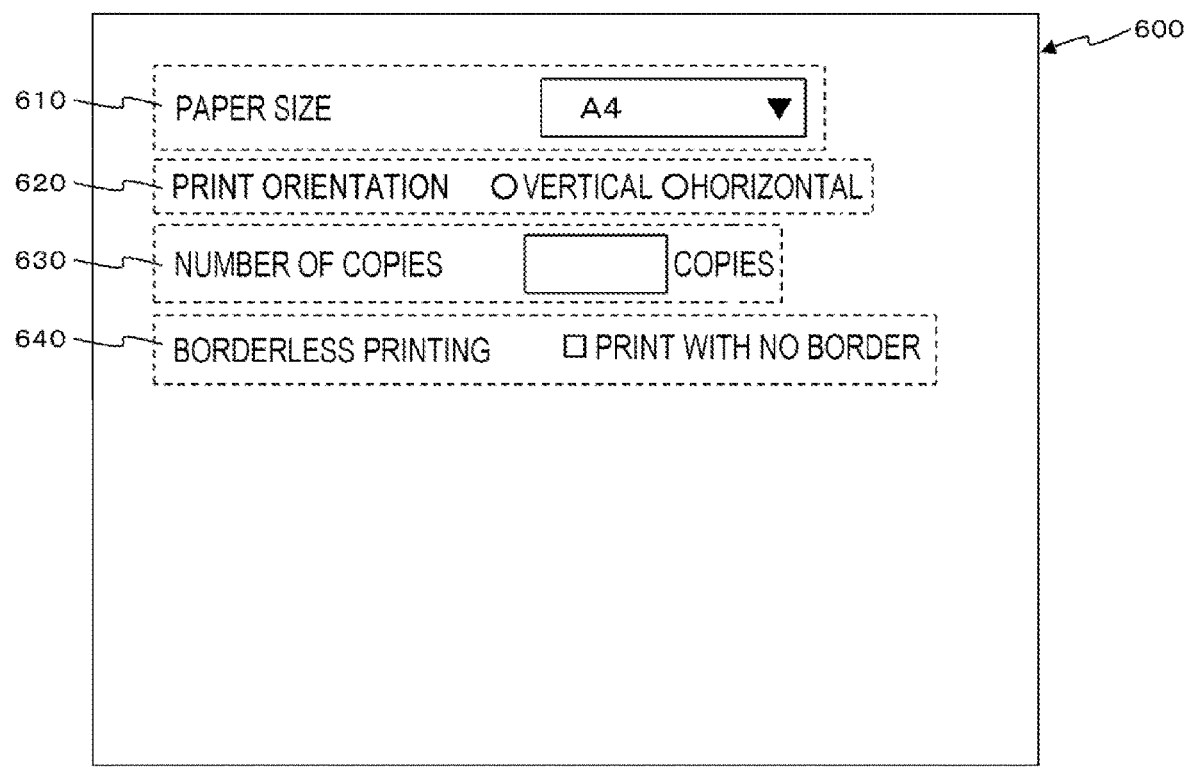
FIG. 6 is an explanatory view illustrating a presentation example of a screen according to the present exemplary embodiment.

FIG. 6 is an explanatory view illustrating an example of presentation of a screen 600 according to the present exemplary embodiment. This example illustrates an example of presentation in a case where all sides are set to the non-borderless printing.

A paper size designation field 610, a print orientation designation field 620, a number-of-copy designation field 630 and a borderless printing designation field 640 are displayed on the screen 600. In the borderless printing designation field 640, since all sides are set to the non-borderless printing, "borderless printing" is not selected.

Figure 7:
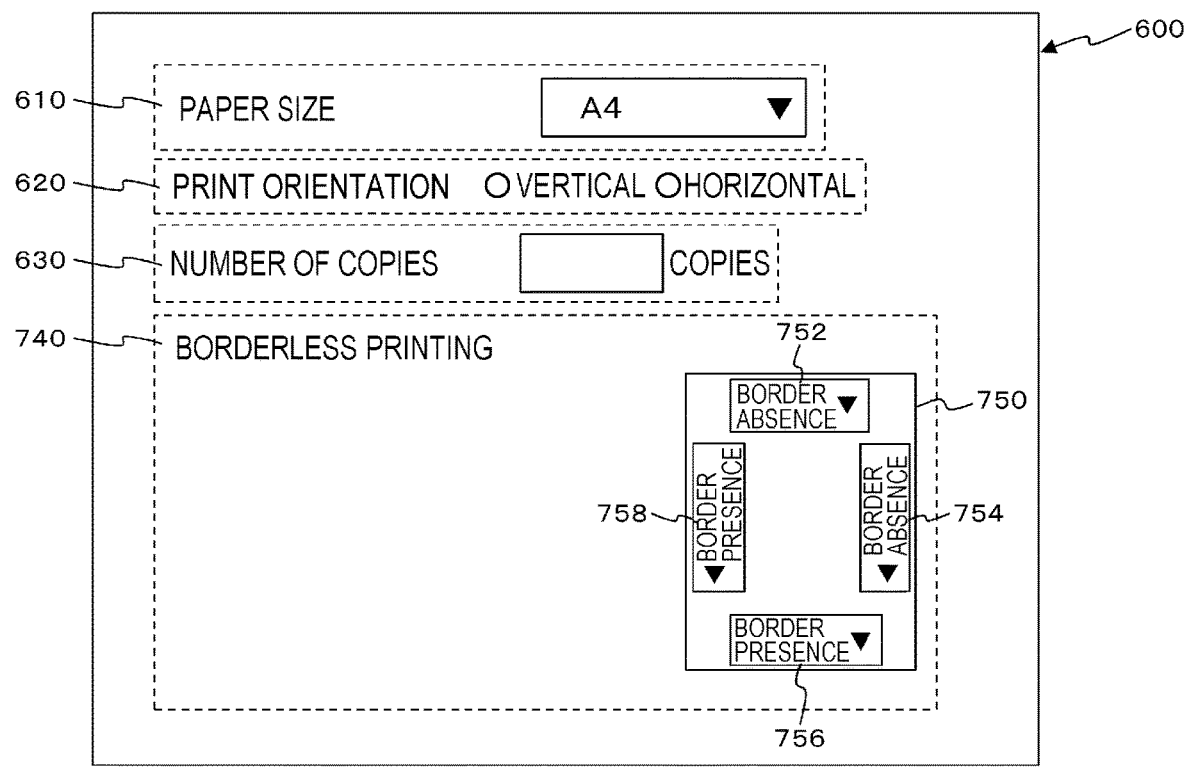
FIG. 7 is an explanatory view illustrating a presentation example of a screen according to the present exemplary embodiment.

FIG. 7 is an explanatory view illustrating an example of presentation of the screen 600 according to the present exemplary embodiment. This example illustrates an example of presentation in a case where a side of the borderless printing and a side of the non-borderless printing are mixed.

A paper size designation field 610, a print orientation designation field 620, a number-of-copy designation field 630 and a borderless printing designation field 740 are displayed on the screen 600. A thumbnail image 750 of print data is displayed in the borderless printing designation field 740. The thumbnail image 750 has a border absence/presence setting area 752, a border absence/presence setting area 754, a border absence/presence setting area 756 and a border absence/presence setting area 758. Here, the border absence/presence setting area 752 (upper side) is set to "border absence," the border absence/presence setting area 754 (right side) is set to "border absence," the border absence/presence setting area 756 (lower side) is set to "border presence," and the border absence/presence setting area 758 (left side) is set to "border presence."

In step S318, the presentation module 130 changes the setting according to the operation of the operator. In the example of FIG. 6, a selection of "borderless printing" may be received in response to a user's operation in the borderless printing designation field 640. That is, even after it is determined that "non-borderless printing" is appropriate, "non-borderless printing" may be changed to "borderless printing" by the user's operation. In the example of FIG. 7, a change in the selection of "borderless printing" or "non-borderless printing" for each side can be received in response to the user's operation. That is, for each side, even after it is determined that "borderless printing" or "non-borderless printing" is appropriate, a change from "non-borderless printing" to "borderless printing" or from "borderless printing" to "non-borderless printing" for each side is performed by the user's operation.

In step S320, the print instruction module 135 determines whether or not the setting for borderless printing and the setting for non-borderless printing are mixed in one medium. When it is determined that they are mixed, the process proceeds to step S322. Otherwise, the process proceeds to step S326.

In step S322, the print instruction module 135 determines whether or not a side that is set to the setting for non-borderless printing is located at the head. When it is determined that the side that is set to the setting for non-borderless printing is located at the head, the process proceeds to step S326. Otherwise, the process proceeds to step S324. Here, the head refers to a side on which an image is first formed in a medium to be printed.

In step S324, the print instruction module 135 rotates the print data so that the side that is set to the setting for non-borderless printing is located at the head. In a case where a side that is set to the setting for borderless printing is located at the head, there is a possibility that contamination of an image (e.g., contamination caused by toner sticking out from the edge of a medium) spreads over the entire medium. Therefore, the print data is rotated so that a side that is set to the setting for non-borderless printing is located at the head.

In step S326, the print attribute setting module 110 sets other attributes. The settings for the paper size designation field 610, the print orientation designation field 620, the number-of-copy designation field 630 and the like illustrated in the example of FIG. 6 correspond to the other attributes.

In step S328, the print instruction module 135 issues a print instruction to the image forming device 200. For example, the print instruction module 135 generates a print instruction table 800 and passes it to the image forming device 200 as a print job. FIG. 8 is an explanatory view illustrating an example of the data structure of the print instruction table 800. The print instruction table 800 has a print instruction field 810, a print data field 820, a paper size field 830, a print orientation field 840, a number-of-copy field 850, a borderless printing field 860 and the like. The borderless printing field 860 has an upper side field 862, a right side field 864, a lower side field 866 and a left side field 868.

The print instruction field 810 stores a print instruction. The print data field 820 stores print data to be printed. The paper size field 830 stores the size of a paper to be printed. The print orientation field 840 stores a print orientation. The number-of-copy field 850 stores the number of copies to be printed. The borderless printing field 860 stores information as to whether or not the borderless printing is set. The upper side field 862 stores information as to whether or not the upper side is borderless printing. The right side field 864 stores information as to whether or not the right side is borderless printing. The lower side field 866 stores information as to whether or not the lower side is borderless printing. The left side field 868 stores information as to whether or not the left side is borderless printing. Of course, information as to whether or not the entire paper, rather than each side, is set to the setting for borderless printing (information indicating borderless printing when there is borderless printing even on one side) may be stored.

Figure 9:
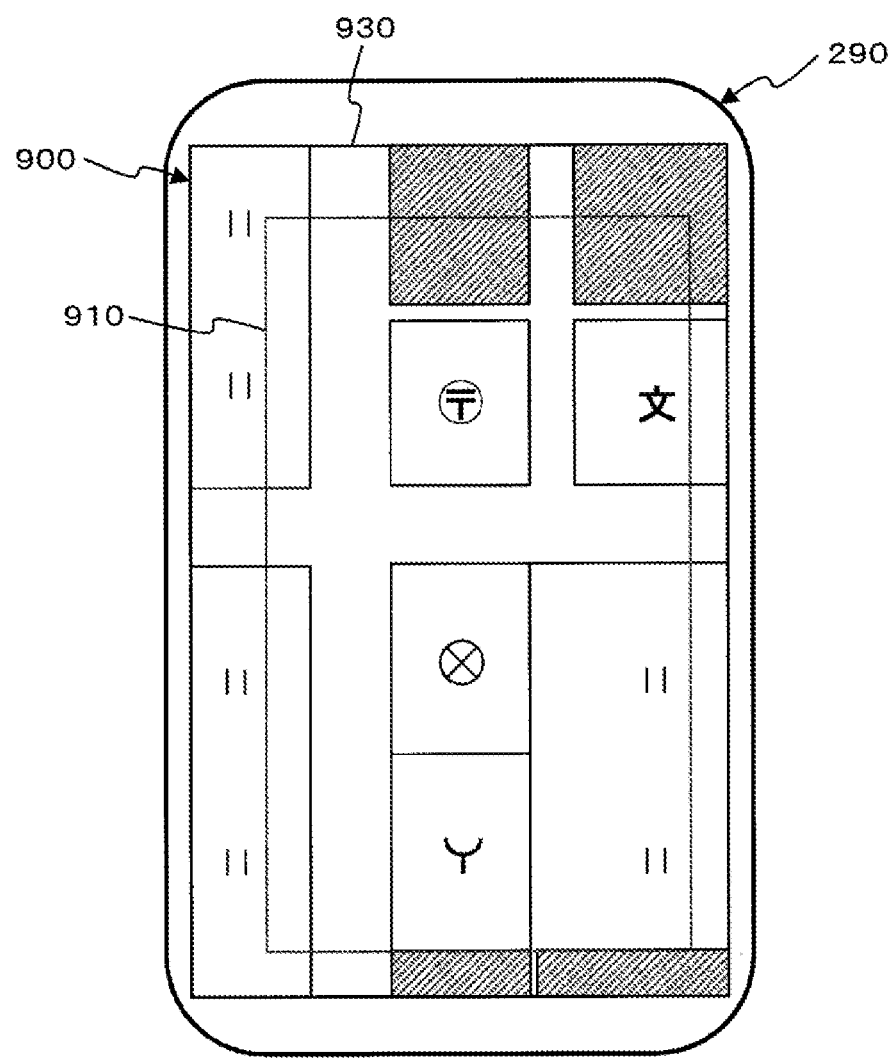
FIG. 9 is an explanatory view illustrating an example of a process according to the present exemplary embodiment.

FIG. 9 is an explanatory view illustrating an example of a process according to the present exemplary embodiment.

When a user clips a portion of an image displayed on a screen 900 of the user terminal 290, which is a PC, a smartphone or the like, is clipped and gives an instruction to print, most of the clipped data has an image up to the edge portions thereof. In the example of FIG. 9, when a print instruction area 910 is designated, there are images at the edges of the print instruction area 910, respectively, and the borderless printing should be set. That is, by preferentially setting the setting for borderless printing and outputting a print setting screen, it is possible to reduce the operation until a print instruction is issued. As a matter of course, if no print instruction area 910 is designated, the entire image displayed on the screen 900 may be taken as a print target.

In particular, when the print data is generated by taking a screenshot, since the above is often applicable (there are images up to the edge portions), the setting for borderless printing may be defaulted. Specifically, instead of the processing from step S306 to step S314 in the flowcharts illustrated in the examples of FIGS. 3 and 4, it is determined whether or not the print data is generated by taking a screenshot. When it is determined that the print data is generated by taking a screenshot, the setting for borderless printing may be selected. When it is determined that the print data is not generated by taking a screenshot, the setting for non-borderless printing may be selected.

Figure 10:
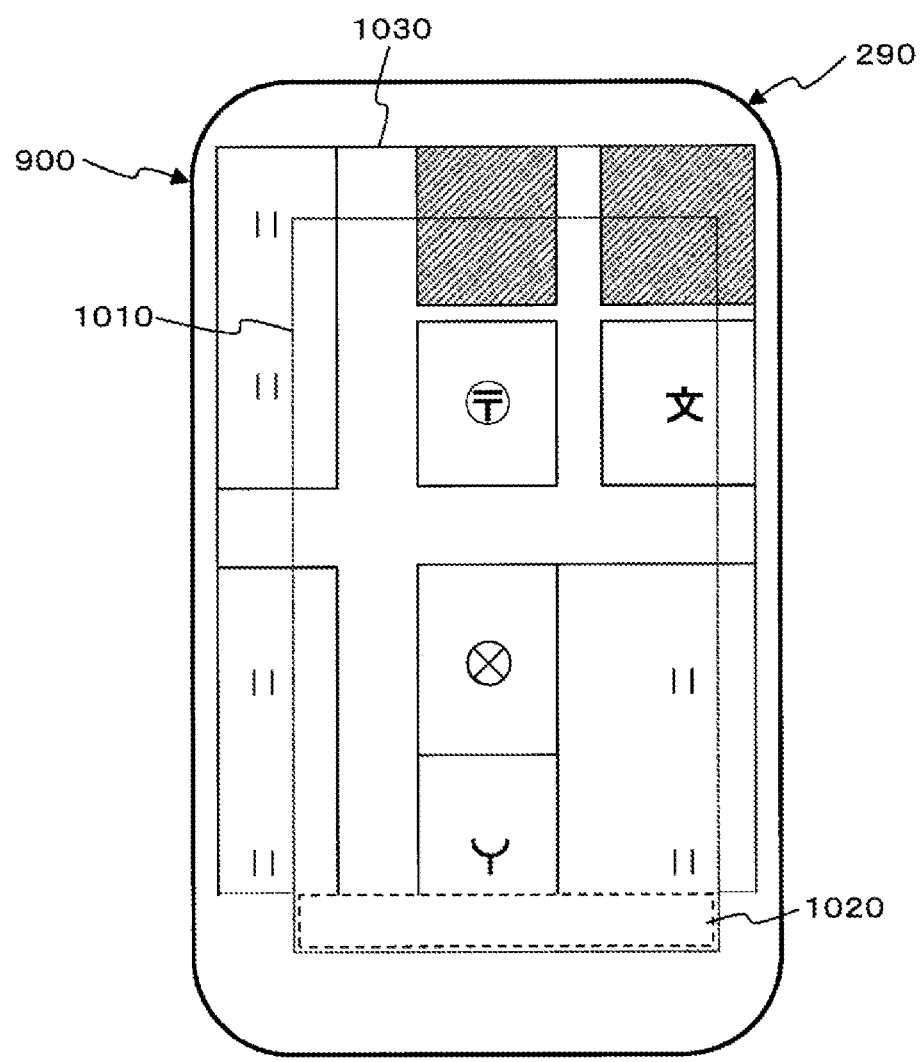
FIG. 10 is an explanatory view illustrating the example of the process according to the present exemplary embodiment.

FIG. 10 is an explanatory view illustrating an example of a process according to the present exemplary embodiment. When the image forming device 200 can perform "borderless printing" or "non-borderless printing" for each side, the "setting for borderless printing" or the "setting for non-borderless printing" may be made for each side.

In the example of FIG. 10, when a print instruction area 1010 is designated for an image 1030 displayed on the screen 900, there are images on three sides (upper side, right side and left side) of the print instruction area 1010, and there is a blank area 1020 on the lower side. In this case, a print instruction is issued with only the lower side (trailing end) being set to the setting for non-borderless printing and the other sides being set to the setting for borderless printing.

Figure 11:
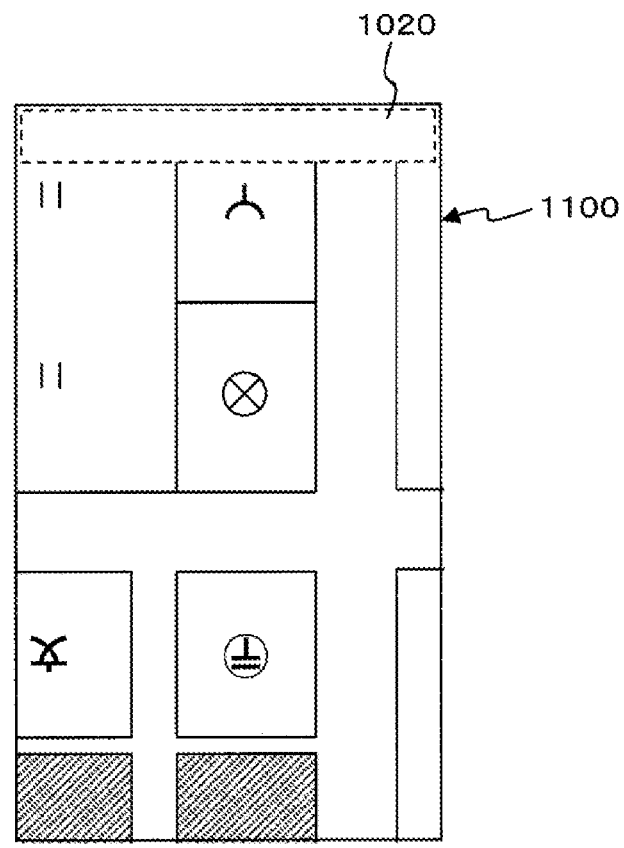
FIG. 11 is an explanatory view illustrating the example of the process according to the present exemplary embodiment.

FIG. 11 is an explanatory view illustrating an example of a process according to the present exemplary embodiment. In the example of FIG. 10, only the lower side (trailing end) is set to the setting for non-borderless printing and the others sides are set to the setting for borderless printing. However, as described above, when the upper side (leading end) is set to the setting for borderless printing, contamination tends to occur in the entire medium (particularly the leading end portion thereof) due to toner sticking out from the edge. Therefore, in a case where sides that are set to the setting for borderless printing is set and sides that are set to the setting for non-borderless printing are mixed, the print data is rotated so that a side that is set to the setting for non-borderless printing is located at the leading end.

Print data 1100 illustrated in the example of FIG. 11 is obtained by rotating the image 1030 in the print instruction area 1010 illustrated in FIG. 10 by 180 degrees. Therefore, the blank area 1020 is located at the upper portion of the print data 1100. As a result, since non-borderless printing is performed at the upper end, the toner sticking out from the edge of the upper end becomes smaller than that in at least the borderless printing, thereby preventing contamination.

Figure 12:
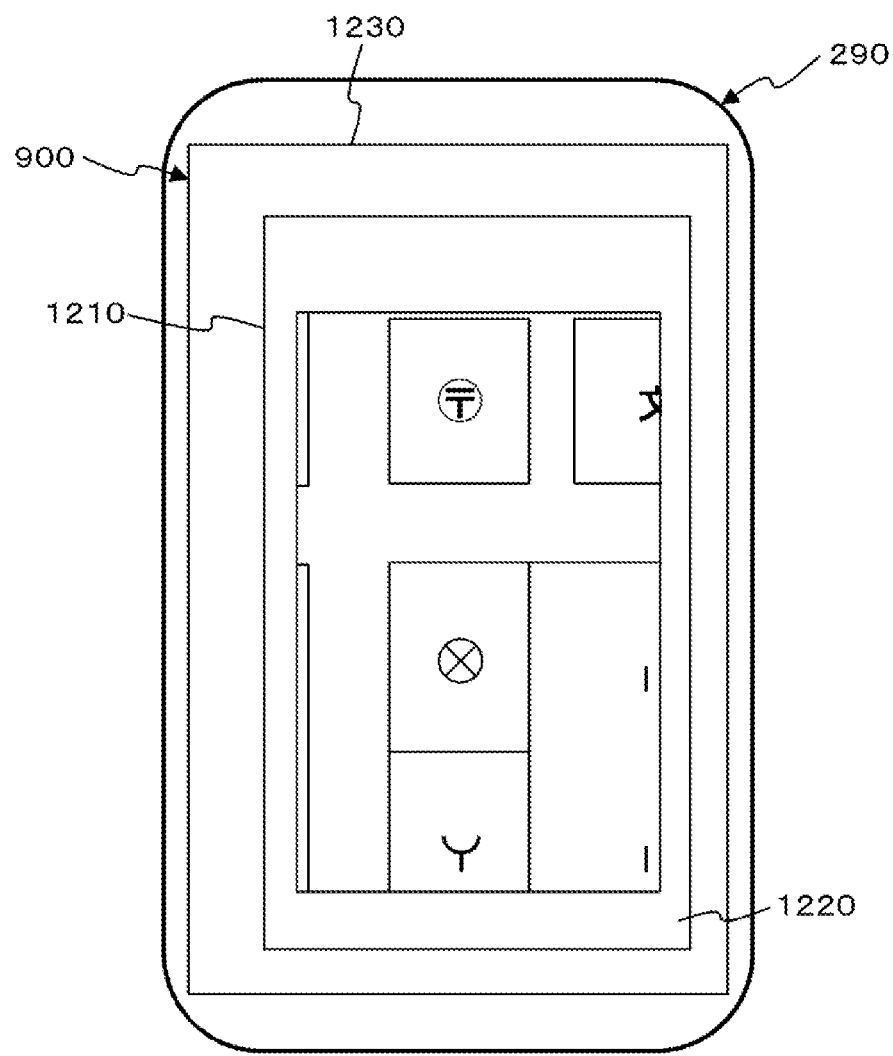
FIG. 12 is an explanatory view illustrating the example of the process according to the present exemplary embodiment.

FIG. 12 is an explanatory view illustrating an example of a process according to the present exemplary embodiment. When there are no images on all sides, the setting for non-borderless printing is set. In the example of FIG. 12, when a print instruction area 1210 is designated for an image 1230 displayed on the screen 900, since there is no image on each side of the print instruction area 1210 (surrounded by a blank area 1220), a print instruction is issued with the setting for non-borderless printing.

The image forming device 200 according to the present exemplary embodiment has a printing function and generally corresponds to a printer, a copying machine, a multi-function peripheral (an image processing device having at least one function of a printer and a copying machine and having plural functions such as a scanner and a facsimile), and the like.

Figure 13:
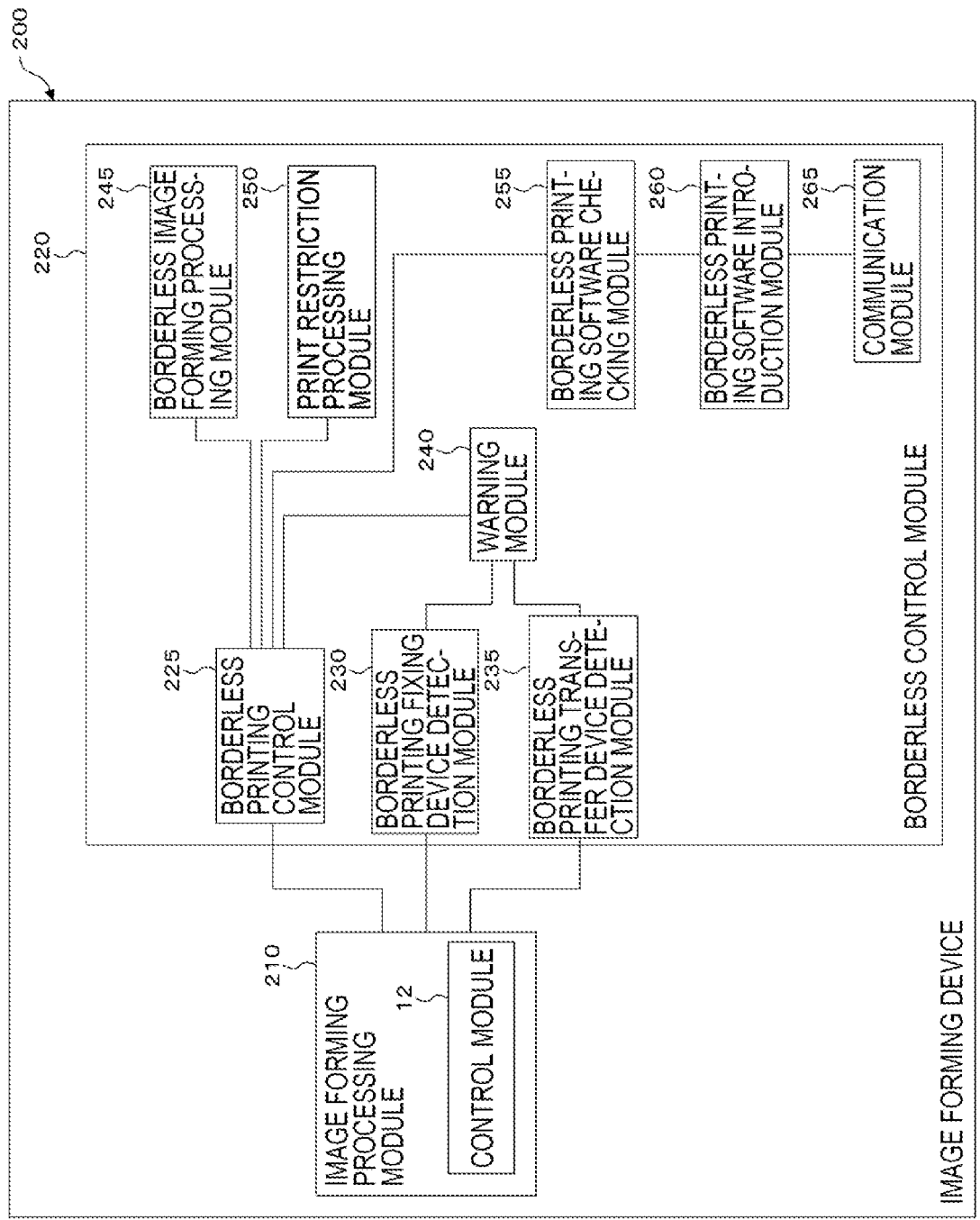
FIG. 13 is a conceptual module configuration diagram of a configuration example of the present exemplary embodiment.

As illustrated in the example of FIG. 13, the image forming device 200 has an image forming processing module 210 and a borderless control module 220. In the image forming device 200, a fixing device for borderless printing or a transfer device for borderless printing is replaceable. Only the fixing device for borderless printing may be replaceable, or only the transfer device for borderless printing may be replaceable, or both of the fixing device for borderless printing and the transfer device for borderless printing may be replaceable. The phrase "replacing (setting or mounting) a fixing device for borderless printing" means replacing a fixing device not for borderless printing (a general fixing device for non-borderless printing) with a fixing device for borderless printing and vice versa. The phrase "replacing a transfer device for borderless printing" means replacing a transfer device not for borderless printing (a general transfer device for non-borderless printing) with a transfer device for borderless printing and vice versa.

The image forming device 200 is capable of performing the borderless printing. In a case where a fixing device for borderless printing and a transfer device for borderless printing are attached to the image forming device 200, the borderless printing can be performed with a high image quality. Even when one or more of a fixing device for borderless printing and a transfer device for borderless printing are not attached to the image forming device 200, the borderless printing itself is possible. However, as compared with the case where both of them are attached, this may cause reduction of the image quality or damage of the image forming device 200. Further, it is difficult to recognize from the outside whether or not a fixing device for borderless printing and a transfer device for borderless printing are attached to the image forming device 200. An example of a difference between a fixing device for borderless printing or a transfer device for borderless printing and a general fixing device or a general transfer device is a cleaning mechanism.

In a case where designation is made to use the borderless printing function, the image forming device 200 determines whether or not the fixing device or the transfer device is one for borderless printing, and issues a warning when the fixing device or the transfer device is not for borderless printing. Of course, depending on the user's operation, the borderless printing is performed despite the warning.

The image forming processing module 210 has a control module 12 and is connected to a borderless printing control module 225, a borderless printing fixing device detection module 230 and a borderless printing transfer device detection module 235 of the borderless control module 220. The image forming processing module 210 performs image forming processing in the image forming device 200. Specifically, a printing process is performed in accordance with a user's operation, a print instruction from the user terminal 290 or the like. When the print instruction includes designation of the borderless printing, the borderless control module 220 is caused to perform the process. Each side of a medium to be printed may be set to the borderless printing. Therefore, the setting for borderless printing and the setting for non-borderless printing may be mixed. In that case, a fixing device for borderless printing or a transfer device for borderless printing may be used.

The control module 12 controls the image forming processing module 210 to perform the image forming processing.

The detailed process (particularly, borderless printing process) of the image forming processing module 210 and the control module 12 will be described later with reference to examples of FIG. 15 to FIGS. 17A to 17C.

The borderless control module 220 includes the borderless printing control module 225, the borderless printing fixing device detection module 230, the borderless printing transfer device detection module 235, a warning module 240, a borderless image forming processing module 245, a print restriction processing module 250, a borderless printing software checking module 255, a borderless printing software introduction module 260 and a communication module 265. The borderless control module 220 executes a process for a case where designation of borderless printing is included in the print instruction.

The borderless printing control module 225 is connected to the image forming processing module 210, the warning module 240, the borderless image forming processing module 245, the print restriction processing module 250 and the borderless printing software checking module 255. The borderless printing control module 225 controls the modules in the borderless control module 220 according to an instruction from the image forming processing module 210.

The borderless printing fixing device detection module 230 is connected to the image forming processing module 210 and the warning module 240. The borderless printing fixing device detection module 230 detects whether or not there is a fixing device for borderless printing in the image forming processing module 210. Further, as a fixing device for borderless printing, a cleaner unit attached to the fixing device may be detected.

The borderless printing transfer device detection module 235 is connected to the image forming processing module 210 and the warning module 240. The borderless printing transfer device detection module 235 detects whether or not there is a transfer device for borderless printing in the image forming processing module 210. Further, as a transfer device for borderless printing, a cleaner unit attached to the transfer device may be detected.

The borderless printing fixing device detection module 230 and the borderless printing transfer device detection module 235 may make the detections depending on whether or not information (flag or attribute information) indicating that a fixing device for borderless printing and a transfer device for borderless printing are set is stored in a predetermined memory area. This memory area may be in a memory unit provided in the fixing device or the transfer device or may be in a memory unit in the image forming device 200. In addition, whether or not a fixing device for borderless printing and a transfer device for borderless printing are set may be detected by a sensor. Examples of the sensor include an optical sensor, a magnetic sensor, a mechanical switch or the like. When the fixing device for borderless printing and the transfer device for borderless printing are set, the sensor is turned ON (or OFF). Upon reception of this, the determination may be made. Particularly, in a case where the above described memory area is not provided, the detections may be made by the sensor.

The warning module 240 is connected to the borderless printing control module 225, the borderless printing fixing device detection module 230, and the borderless printing transfer device detection module 235. The warning module 240 issues a warning when the borderless printing function is used and when the fixing device or the transfer device is not for borderless printing. The phrase "when the borderless printing function is used" corresponds to a case of receiving a print instruction including designation of the borderless printing from the user's operation, the user terminal 290 or the like, as described above. The phrase "when the fixing device or the transfer device is not for borderless printing" corresponds to when the borderless printing fixing device detection module 230 does not detect that the fixing device for borderless printing is set or when the borderless printing transfer device detection module 235 does not detect that the transfer device for borderless printing is set. Variations of "when the fixing device or the transfer device is not for borderless printing" include "when the fixing device is not for borderless printing," "when the transfer device is not for borderless printing" and "when both of the fixing device and the transfer device are not for borderless printing." In a case where the image forming device 200 itself can execute the borderless printing of a high image quality with only the fixing device for borderless printing (not a transfer device for borderless printing but a general transfer device), only "when the fixing device is not for borderless printing" is sufficient. In a case where the image forming device 200 itself can perform the borderless printing of a high image quality with only the transfer device for borderless printing (not a fixing device for borderless printing but a general fixing device), only "when the transfer device is not for borderless printing" is sufficient. Alternatively, when only the fixing device for borderless printing is replaceable in the image forming device 200 (the transfer device cannot be replaced), only "when the fixing device is not for borderless printing" is sufficient. When only the transfer device for borderless printing is replaceable in the image forming device 200 (the fixing device cannot be replaced), only "when the transfer device is not for borderless printing" is sufficient.

The warning may include an output as a 3D (Dimensions) image in addition to displaying the warning content on a display device such as a liquid crystal display and may further include outputting of an alarm sound (including a warning voice) to a sound output device such as a speaker, a vibration, or a combination thereof.

The borderless image forming processing module 245 is connected to the borderless printing control module 225. When a fixing device for borderless printing or a transfer device for borderless printing is not attached and when a designation of the borderless printing function is received, the borderless image forming processing module 245 executes another image forming process different from that in the case where the fixing device for borderless printing and the transfer device for borderless printing are attached. The determination about "a fixing device for borderless printing or a transfer device for borderless printing is not attached" may be made based on the detection results by the borderless printing fixing device detection module 230 and the borderless printing transfer device detection module 235, as described above. The phrase "when a designation of a borderless printing function is received" corresponds to a case where a print instruction including a designation of the borderless printing is received from the user's operation, the user terminal 290, etc. as described above.

The "different image forming process" may include lowering the density of an image of a peripheral portion which is an edge. The peripheral portion corresponds to four sides of a paper (portions having a predetermined width from the edge) which are not printed in general printing (non-borderless printing). By lowering the density of an image printed on the peripheral portion, the amount of toner that needs cleaning is reduced. For example, the density is reduced to 80% of the original density. Further, instead of uniformly lowering the density of the peripheral portion, the amount of lowered density may be increased toward the edge. Furthermore, instead of lowering the density of all the four sides, the density of only an edge portion of a leading end portion in a paper transport direction or the four sides which are side edges of a paper may be selectively lowered. Further, when the density of the images of the four sides is equal to or less than a predetermined density, the process of lowering the density may not be performed.

Further, as the "different image forming process," the cleaning of the transfer device or the fixing device may execute more frequently than in the case where the fixing device for borderless printing and the transfer device for borderless printing are mounted. For example, in the case of borderless printing, the number of times of cleaning may be increased. In addition, in order to increase the number of times of cleaning, only the paper may be transported without image formation after the borderless printing (the paper may be processed by the fixing device and the transfer device so that the paper adsorbs the residual toner, which is the cause of contamination). Of course, when it is not possible to make idle rotation without image formation, an image close to the ground color of the paper (a white image for a white paper) or a transparent clear image may be formed and a cleaning operation may be performed with the formed image. Further, it is also possible to use a paper of a size larger than the size of a paper for which the borderless printing is performed. This is because the borderless printing is to print an image that sticks out from the paper. Further, the cleaning process may be performed for each borderless printing or for each print job.

Further, when the borderless printing is performed continuously with the same size, it may be controlled not to perform an increased cleaning process. However, after the last printing, an increased cleaning process is performed. Further, when the next borderless printing is performed with a size smaller than the paper size of the previous borderless printing, it may be controlled not to perform an increased cleaning process. However, after the last printing, an increased cleaning process is performed. Conversely, when the next borderless printing is performed with a size larger than the paper size of the previous borderless printing, it may be controlled to perform the increased cleaning process.

The print restriction processing module 250 is connected to the borderless printing control module 225. When a warning is issued by the warning module 240, the print restriction processing module 250 restricts the use of the borderless printing function. The "restriction on the use of the borderless printing function" may be the restriction on the number of times of use or the restriction on the user. The restriction on the number of times of use is to control not to permit "the use of the borderless printing function" when the number of times the borderless printing function is used is equal to or more than a predetermined threshold value. The restriction on the number of times of use includes, for example, the restriction on the number of printed copies, the restriction on the number of times of use for each paper size, the restriction on the number of times of use per monochrome/color, and the like. The restriction on the user is to control so that "the use of the borderless printing function" is permitted for only a predetermined user. The restriction on the user includes, for example, identification by a user ID (Identification), identification by a user's role (specifically, a group leader, a designer, etc.), and the like. A combination of the restriction on the number of times of use and the restriction on the user may be used. For example, the restriction on the number of times of use may be set for each user ID.

The borderless printing software checking module 255 is connected to the borderless printing control module 225 and the borderless printing software introduction module 260. When the fixing device for borderless printing and the transfer device for borderless printing are attached, the borderless printing software checking module 255 checks whether or not software (program) usable for the borderless printing is introduced. As described above, the determination on whether or not the fixing device for borderless printing and the transfer device for borderless printing are attached (or whether or not they have been attached) may be made based on the detection results by the borderless printing fixing device detection module 230 and the borderless printing transfer device detection module 235. Whether or not software usable for borderless printing is introduced may be determined by checking whether or not information (flag or attribute information) indicating that the software is introduced is stored in a predetermined memory area or checking whether or not a software ID usable for borderless printing is acquired from a software storage server 1410 and is introduced in the image forming processing module 210.

The borderless printing software introduction module 260 is connected to the borderless printing software checking module 255 and the communication module 265. In accordance with the checking result by the borderless printing software checking module 255, the borderless printing software introduction module 260 introduces the software via a communication line when software usable for borderless printing is not introduced. Specifically, software may be searched from the software storage server 1410 with a model of the image forming device 200 as a search key (in some cases, including device IDs of the fixing device for borderless printing and the transfer device for borderless printing, in the search key).

The communication module 265 is connected to the borderless printing software introduction module 260. The communication module 265 communicates with the software storage server 1410. Specifically, in accordance with an instruction from the borderless printing software introduction module 260, the communication module 265 transmits a request for software usable for borderless printing and receives the software.

Figure 14:
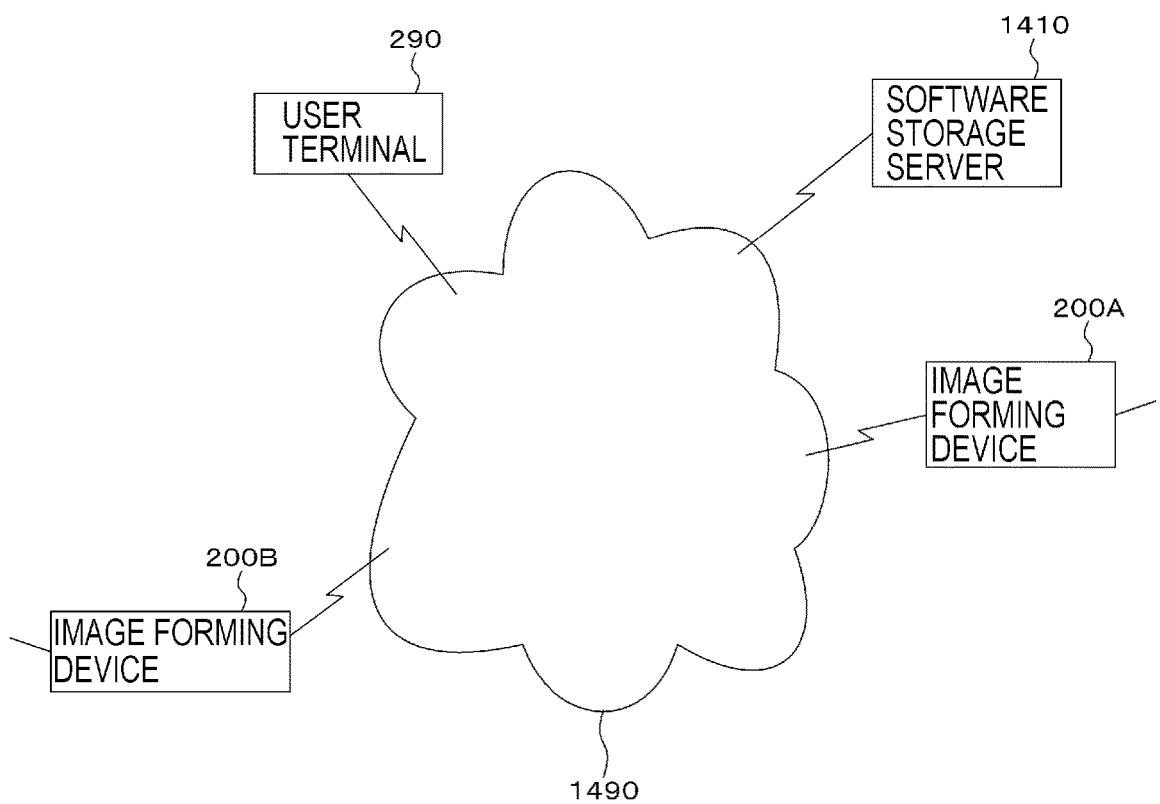
FIG. 14 is an explanatory view illustrating a system configuration example using the present exemplary embodiment.

FIG. 14 is an explanatory view illustrating a system configuration example using the present exemplary embodiment.

The image forming device 200A, the image forming device 200B, the software storage server 1410 and the user terminal 290 are connected via a communication line 1490. The communication line 1490 may be wireless, wired, or a combination thereof. The communication line 1490 may be, for example, the Internet, as an infrastructure for communication, an intranet, etc. The user terminal 290 may be, for example, a personal computer (notebook PC) having a communication function, a portable terminal or the like and instructs the image forming device 200 to print in response to a user's operation. Further, the function of the software storage server 1410 may be implemented as a cloud service.

Upon receiving from the user terminal 290 a print instruction including designation of the borderless printing, the image forming device 200 performs different processes depending on whether or not a fixing device for borderless printing or a transfer device for borderless printing is set in the image forming device 200. In addition, the image forming device 200 downloads software usable for borderless printing from the software storage server 1410.

Figure 15:
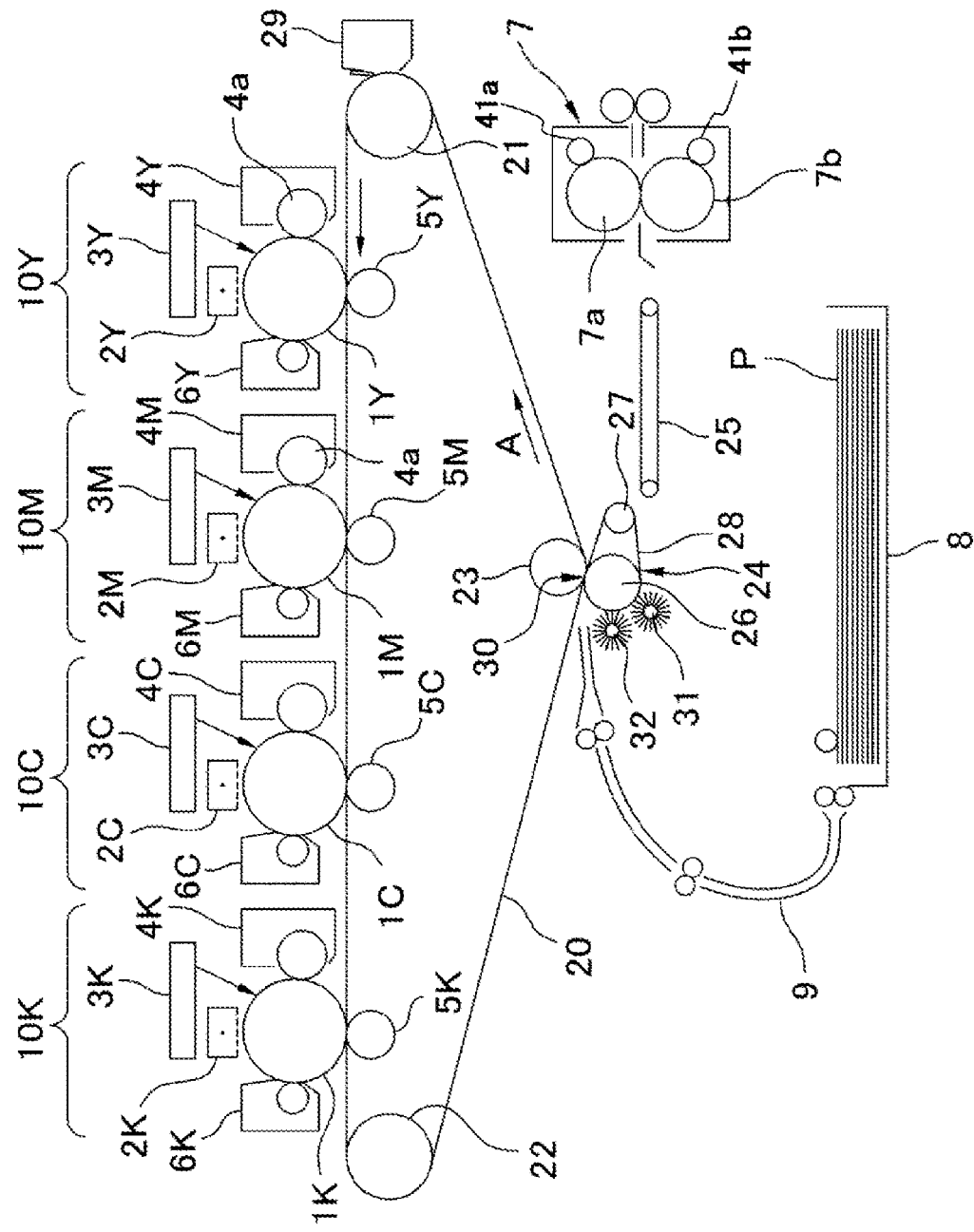
FIG. 15 is a schematic internal configuration diagram of an image forming processing module.
Figure 16:
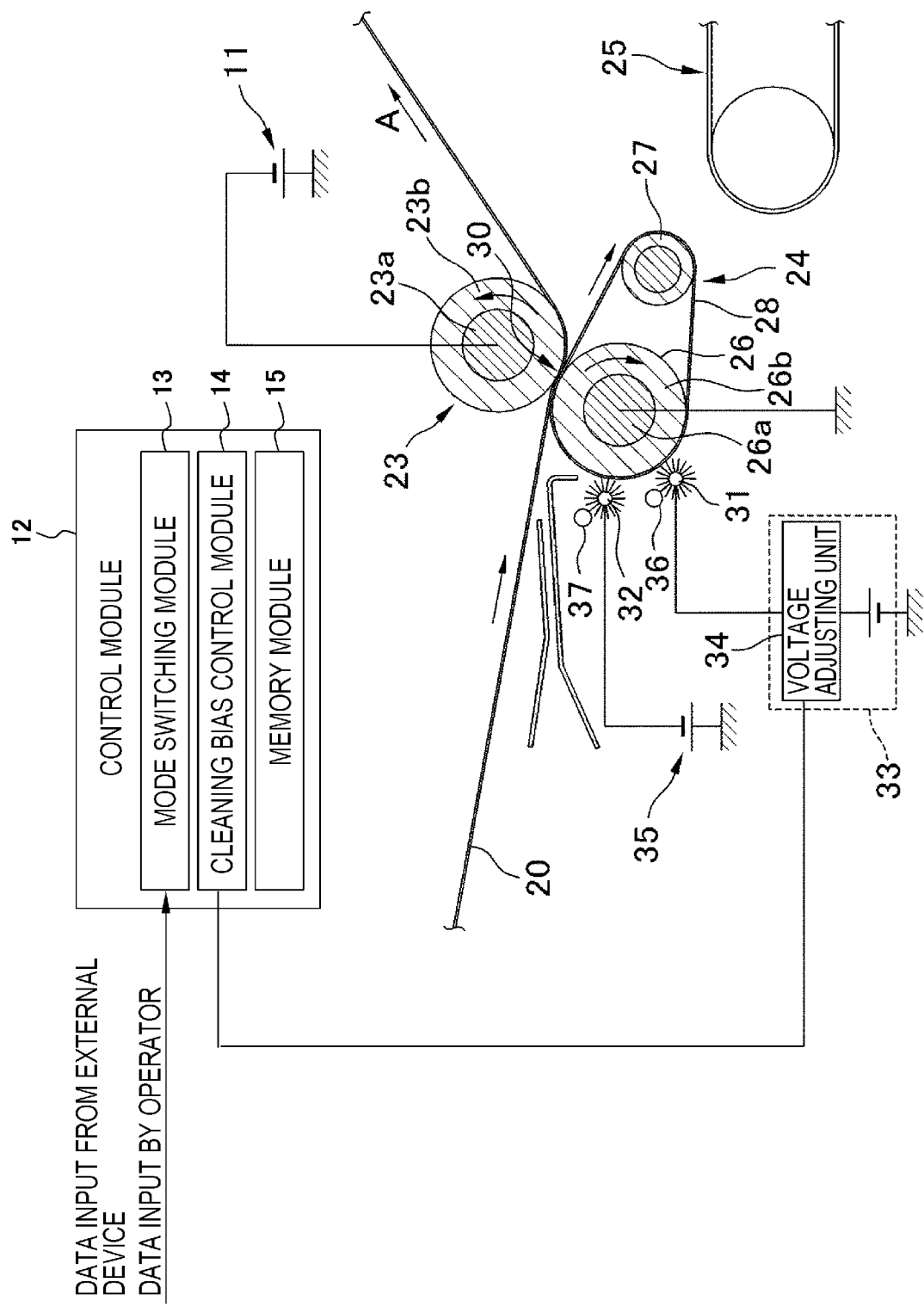
FIG. 16 is a view illustrating a configuration in the vicinity of a position where a secondary transfer of the image forming processing module is performed and a configuration for controlling a bias voltage applied between a secondary transfer member and a cleaning member.

FIG. 15 is a schematic internal configuration diagram of the image forming processing module 210. Further, FIG. 16 is a view illustrating a configuration in the vicinity of a position where the secondary transfer of the image forming processing module 210 illustrated in FIG. 15 is performed and a configuration for controlling a bias voltage applied between a secondary transfer member and a cleaning member.

In an image forming device that transfers powdery toner to a latent image by an electrostatic potential difference to form a toner image, the toner image is formed by depositing toner on an endless peripheral surface of a latent image carrying member on which a latent image is formed. Then, the formed toner image is directly transferred from the latent image carrying member onto a recording medium, or is primarily transferred from the latent image carrying member onto an intermediate transfer body and secondarily transferred onto the recording medium. As a transfer member for transferring the toner image onto the recording medium, a transfer roller provided so as to be in contact with the circumferential surface of the latent image carrying member or the intermediate transfer body and having a circulatively-moving endless peripheral surface or a transfer belt stretched around plural roller-shaped members is generally used. Such a transfer member sandwiches the recording medium fed to a transfer area which is a position facing the latent image carrying member or the intermediate transfer body and passes the recording medium in contact with the rear surface of the recording medium. Then, an electric field is formed between the transfer member and the latent image carrying member or the intermediate transfer body by applying a transfer bias voltage, and the toner image is transferred onto the recording medium within this electric field.

In such an image forming device, normal printing in which a toner image is transferred while leaving a margin on the outer circumference of a recording medium is common. However, a device capable of transferring a toner image onto the entire surface of a recording medium, that is, a so-called borderless printing device, has been developed. In the borderless printing, the toner image is formed in a range larger than the size of the recording medium, and the toner image is transferred to the entire surface of the recording medium while sticking out from the recording medium to its surrounding. Therefore, when the borderless printing is executed, in a transfer area, the toner sticking out from the recording medium is transferred onto the peripheral surface of the transfer member.

In addition, so-called fogging toner adheres slightly to the latent image carrying member even outside the area where the toner image is formed. In a device for directly transferring the toner image from the latent image carrying member onto the recording medium, the fogging toner is transferred from an area not facing the recording medium at the transfer position onto the peripheral surface of the transfer member. Further, in a device for primarily transferring a toner image from the latent image carrying member onto the intermediate transfer body and secondarily transferring the toner image from the intermediate transfer body onto the recording medium, the fogging toner is transferred onto the intermediate transfer body at a primary transfer position and is transferred from an area not facing the recording medium onto the peripheral surface of the transfer member at a secondary transfer position.

When the toner circulates while adhering to the peripheral surface of the transfer member in this manner, the toner adheres to the rear surface of the recording medium fed to the transfer area, which contaminates the rear surface of the recording medium. To deal with this, for example, JP-A-2008-89657 proposes an image forming device in which a cleaning device for cleaning the peripheral surface of a transfer member is provided and a toner transferred onto the peripheral surface of the transfer member is removed.

The amount of toner transferred onto the peripheral surface of the transfer member in the transfer area in which the latent image carrying member or the intermediate transfer body and the transfer member are opposed to each other greatly varies between the normal printing and the borderless printing. Further, it may be considered that the amount of transferred toner varies depending on temperature, humidity and the like. When the toner cannot be sufficiently removed from the peripheral surface of the transfer member with respect to the amount of transferred toner which varies in this way, the rear surface of the recording medium would be contaminated.

The image forming processing module 210 prevents contamination from occurring on the rear surface of the recording medium onto which the toner image is transferred. Then, a case where a fixing device for borderless printing and a transfer device for borderless printing are set will be described.

The image forming device 200 is, for example, an image forming device that forms a color image using toners of four colors. The image forming device 200 includes electrophotographic type image forming units 10Y, 10M, 10C and 10K that output images of yellow (Y), magenta (M), cyan (C) and black (K), respectively, and an intermediate transfer belt 20 that faces these units. The intermediate transfer belt 20 functions as an image carrier and stretches so as to face each of the image forming units 10. The peripheral surface of the intermediate transfer belt 20 is circulatively driven. On the downstream side of the position where the image forming units 10 face the intermediate transfer belt 20 in the circulative movement direction of the intermediate transfer belt 20, a secondary transfer member 24 for secondary transfer is disposed so as to face the intermediate transfer belt 20. The secondary transfer member 24 functions as a transfer member. A sheet-shaped recording medium P is fed from a sheet accommodating unit 8 through a transport path 9 to a secondary transfer position 30 where the secondary transfer member 24 is opposed to the intermediate transfer belt 20, and a toner image on the intermediate transfer belt 20 is transferred onto the recording medium. A transport device 25 for the recording medium onto which the toner image is transferred and a fixing device 7 that fixes the toner image on the recording medium by heating and pressing the toner image are provided downstream of the secondary transfer position 30 in the transport path of the recording medium. Further, a discharged paper holding unit (not illustrated) that holds the recording medium having the toner image fixed thereon is provided downstream thereof.

Meanwhile, a cleaning device 29 for the intermediate transfer belt that collects the toner remaining on the intermediate transfer belt 20 after the secondary transfer is provided on downstream of the secondary transfer position 30 in the circulative movement direction of the intermediate transfer belt 20. Further, in order to collect the toner transferred from the intermediate transfer belt 20 to the secondary transfer member 24 at the secondary transfer position 30, a first cleaning member 31 and a second cleaning member 32 for the secondary transfer member are disposed at a position facing the endless peripheral surface of the secondary transfer member 24.

The image forming device 200 has plural printing modes including a normal printing mode M1 for forming a toner image while leaving a margin on the outer periphery of the recording medium and a borderless printing mode M2 for forming a toner image on the entire surface of the recording medium. Switching between these printing modes is executed by the control module 12 based on data input from an external device or data input by an operator from an operation panel or the like.

The image forming units 10 are arranged in an order of the image forming unit 10Y for forming a yellow toner image, the image forming unit 10M for forming a magenta toner image, the image forming unit 10C for forming a cyan toner image, and the image forming unit 10K for forming a black toner image from the upstream side in the circulative movement direction of the intermediate transfer belt 20. Each of the image forming units 10 has a photoconductor drum 1 on which an electrostatic latent image is to be formed. Each of the image forming units 10 includes a charging device 2 that charges the surface of the photoconductor drum 1, a developing device 4 that selectively transfers a toner to a latent image formed on the photoconductor drum 1 to form a toner image, a primary transfer roller 5 that primarily transfers the toner image on the photoconductor drum 1 onto the intermediate transfer belt 20, and a cleaning device 6 for a photoconductor body that removes the toner remaining on the photoconductor drum after the transfer. Further, an exposure device 3 that generates image light based on an image signal is provided for each photoconductor drum 1. The exposure device 3 irradiates the photoconductor drum 1 with the image light on the upstream side of a position where the developing device 4 faces, thereby writing an electrostatic latent image.

The photoconductor drum 1 is formed by stacking organic photoconductive layers on the peripheral surface of a metal cylindrical member. A metal portion thereof is electrically grounded. Further, a bias voltage may be applied thereto.

The charging device 2 includes an electrode wire stretching to have a gap with respect to the peripheral surface of the photoconductor drum 1 which is a member to be charged. The charging device 2 applies a voltage between the electrode wire and the photoconductor drum 1 to generate corona discharge to charge the surface of the photoconductor drum 1.

In the present exemplary embodiment, as described above, a device that charges the surface of the photoconductor drum 1 by the corona discharge is used. Alternatively, a solid discharger or a contact or non-contact charging device having a roller shape or a blade shape may be used.

The exposure device 3 generates a laser beam blinking based on the image signal and scans the photoconductor drum 1, which is rotated, with the laser beam in the main scanning direction (axial direction) of the photoconductor drum 1 by using a polygon mirror. As a result, an electrostatic latent image corresponding to each color image is formed on the surface of each photoconductor drum 1.

The developing device 4 uses a two-component developer containing a toner and a magnetic carrier. The developing device 4 has a rotating developing roller 4a at a position facing the photoconductor drum 1. A layer of the two-component developer is formed on the peripheral surface of the developing roller 4a. The toner is transferred from the peripheral surface of the developing roller 4a onto the photoconductor drum 1 to visualize an electrostatic latent image. In addition, the toner consumed with the image formation is supplemented according to the amount of consumption.

In the present exemplary embodiment, the photoconductor drum 1 is charged with a negative polarity by the charging device 2, and the negatively-charged toner is transferred onto a portion where the charged potential is attenuated by exposure.

The primary transfer rollers 5 are disposed on the rear surface side of the intermediate transfer belt 20 at positions facing the photoconductor drums 1Y, 1M, 1C and 1K with respect to the image forming units 10Y, 10M, 10C and 10K, respectively. Then, a bias voltage for primary transfer is applied between the primary transfer rollers 5Y, 5M, 5C and 5K and the photoconductor drums 1Y, 1M, 1C and 1K, and the toner images on the photoconductor drums are electrostatically transferred onto the passing intermediate transfer belt 20 at the primary transfer positions at which the primary transfer rollers 5Y, 5M, 5C and 5K and the photoconductor drums 1Y, 1M, 1C and 1K face with each other.

The cleaning device 6 for photoconductor body removes the toner remaining on the photoconductor drum 1 after the transfer, by a cleaning blade disposed to be in contact with the peripheral surface of the photoconductor drum 1.

The intermediate transfer belt 20 is a film shaped member formed in an endless shape by stacking plural layers. The intermediate transfer belt 20 functions as an image carrier. The intermediate transfer belt 20 is circulatively moved in the direction of arrow A illustrated in FIG. 15. The intermediate transfer belt 20 stretches over a driving roller 21 that is rotationally driven, an adjusting roller 22 that adjusts the bias of the intermediate transfer belt 20 in the width direction, and an opposing roller 23 supported at a position facing the secondary transfer member 24.

The secondary transfer member 24 disposed at a position facing the opposing roller 23 with the intermediate transfer belt 20 sandwiched therebetween includes a secondary transfer roller 26, an assist roller 27 and a secondary transfer belt 28 stretching over these rollers 26 and 27. The secondary transfer belt 28 is sandwiched between the opposing roller 23 and the secondary transfer roller 26 in a state of being overlapped with the intermediate transfer belt 20 and is circulatively moved as the intermediate transfer belt 20 is circulatively driven. Further, when a recording medium is fed between the intermediate transfer belt 20 and the secondary transfer belt 28, the recording medium is transported with being sandwiched therebetween.

The secondary transfer roller 26 includes a metal core member 26a and an outer peripheral layer 26b of a rubber material added with conductive particles which is formed on the outer peripheral surface of the metal core member 26a. Further, the opposing roller 23 includes a metal core member 23a and an outer peripheral layer 23b formed on the outer peripheral surface of the metal core member 23a. The outer peripheral layer 23b may be formed of a single layer or plural layers.

As illustrated in FIG. 16, a bias voltage for secondary transfer is applied between the secondary transfer roller 26 and the opposing roller 23 from a power supply 11 for transfer bias to form an electric field for transfer at the secondary transfer position 30.

The fixing device 7 heats and pressurizes the recording medium onto which the toner image has been transferred at the secondary transfer position 30 to fix the toner image on the recording medium. The fixing device 7 includes a heating roller 7a having a heating source therein, and a pressure roller 7b pressed against the heating roller 7a. The recording medium onto which the toner image has been transferred is fed to a contact portion between the heating roller 7a and the pressure roller 7b and the toner image is fixed on the recording medium by being heated and pressurized between the heating roller 7a and the pressure roller 7b which are rotationally driven. In addition, in order to collect the toner transferred onto the heating roller 7a and the pressure roller 7b, a cleaning member 41a is disposed on the heating roller 7a and a cleaning member 41b is disposed on the pressure roller 7b. The cleaning members 41a and 41b perform cleaning in the transfer device. In addition, the cleaning members 41a and 41b may be rollers or blades.

The cleaning device 29 for the intermediate transfer belt removes the residual toner remaining from the peripheral surface of the intermediate transfer belt 20 after the transfer onto the recording medium at the secondary transfer position 30. The cleaning device 29 has a cleaning blade which is in contact with the peripheral surface of the intermediate transfer belt 20. This cleaning blade is used to scrape off (i.e., remove) the toner adhering to the peripheral surface of the intermediate transfer belt 20.

The first cleaning member 31 and the second cleaning member 32 are disposed so as to be in contact with the peripheral surface of the secondary transfer belt 28. Each of the cleaning members 31 and 32 is formed by attaching brush bristles radially around a rotation shaft made of metal. The brush bristles are formed of a resin material mixed with particles for imparting conductivity. Then, a voltage is applied to the brush bristles from the rotation shaft to form an electric field between the brush bristles and the secondary transfer roller 26. That is, between the first cleaning member 31 contacting on the upstream side in the circulative movement direction of the secondary transfer belt 28 and the electrically-grounded secondary transfer roller 26, a cleaning bias voltage is applied from a first cleaning bias power supply 33 to give a positive polarity potential to the first cleaning member 31. Further, between the second cleaning member 32 contacting on the downstream side and the secondary transfer roller 26, a cleaning bias voltage is applied from a second cleaning bias power supply 35 such that the potential of the second cleaning member 32 has the negative polarity. Therefore, the toner charged mainly to the negative polarity is removed from the peripheral surface of the secondary transfer belt 28 by the first cleaning member 31 to which the bias voltage is applied so as to be on the positive polarity side, and the toner charged mainly to the positive polarity is removed by the second cleaning member 32 to which the voltage of the negative polarity is applied.

Reference numerals 36 and 37 in FIG. 16 denote brushing members that brush off the adsorbed toner from the peripheral surface of the secondary transfer belt 28 by contacting the brush bristles of the first cleaning member 31 and the second cleaning member 32.

The first cleaning member 31 functions as a cleaning member. The first cleaning bias power supply 33 that applies a cleaning bias voltage to the first cleaning member 31 functions as a cleaning bias applying unit. Then, a voltage applied from the first cleaning bias power supply 33 to the first cleaning member 31 is controlled by the control module 12.

The control module 12 includes a mode switching module 13 that switches to a printing mode selected from plural printing modes that the image forming device 200 has and a cleaning bias control module 14 that controls the cleaning bias voltage to be applied to the first cleaning member 31. In addition, the control module 12 has a function of controlling the operation of the image forming device 200 to form an image on a recording medium.

The mode switching module 13 functioning as a printing mode switching unit that selects one from the plural printing modes including the normal printing mode M1 and the borderless printing mode M2 based on information input from an external device or information input by an operator using an operation panel or the like, and switches control so that an image is formed according to each mode.

The cleaning bias control module 14 functions as a bias voltage controller. The cleaning bias control module 14 controls a voltage applied from the first cleaning bias power supply 33 to the first cleaning member 31 based on the printing mode switched in the mode switching module 13. That is, the cleaning bias control module 14 makes a voltage adjusting unit 34 of the first cleaning bias power supply 33 to apply a first bias voltage V1 when the printing mode is switched to the normal printing mode M1 and to apply a second bias voltage V2 when the printing mode is switched to the borderless printing mode M2.

The first bias voltage V1 and the second bias voltage V2 are preset and stored in a memory module 15. The second bias voltage V2 which is applied when the borderless printing mode M2 is executed is set to make a potential difference between the secondary transfer roller 26 and the first cleaning member 31 larger than the first bias voltage V1 which is applied when the normal printing mode M1 is executed.

In the present exemplary embodiment, the first bias voltage V1 and the second bias voltage V2 are preset constant values. Alternatively, the bias voltages may be controlled based on environmental conditions such as temperature and humidity and other conditions in addition to the print mode to be executed. However, under the same environmental conditions, the second bias voltage V2 in the borderless printing mode M2 is controlled to make the potential difference larger than the first bias voltage V1 in the normal printing mode M1.

The image forming device 200 operates as follows.

Electrostatic latent images are formed on the four respective photoconductor drums 1, and the toner is transferred from the developing device 4 to form toner images. These toner images are transferred onto the intermediate transfer belt 20 at positions facing the primary transfer roller 5 and are superimposed on the intermediate transfer belt 20 to form a color toner image. This toner image is transported to the secondary transfer position 30 by the circulative movement of the intermediate transfer belt 20 and is transferred from the intermediate transfer belt 20 onto the recording medium P.

When such an image forming operation is executed in the normal printing mode M1, the color toner image is formed in an area smaller than the size of the recording medium and is transferred at the secondary transfer position 30 while leaving a margin on the outer peripheral portion of the recording medium. A so-called fogging toner often adheres somewhat to a portion outside a range where the intermediate transfer belt 20 carries the toner image, for example, a non-image area between an area where the image is carried and an area where a next image is carried. The toner adhering to an area not facing the recording medium at the secondary transfer position 30 is transferred onto the secondary transfer belt 28 at the secondary transfer position 30. The secondary transfer belt 28 is circulatively moved and passes through a position facing the first cleaning member 31 to which the first bias voltage V1 is applied and a position facing the second cleaning member 32, while some of the toner is removed by these cleaning members 31 and 32. Further, some toner remains on the secondary transfer belt 28 without being removed by the cleaning members 31 and 32, but the amount of toner adhering to the non-image area is small, so that the rear surface of the recording medium is not immediately contaminated.

Meanwhile, when image formation is executed in the borderless printing mode M2, the toner image is formed in a range larger than the size of the recording medium. When the image is transferred onto the recording medium at the secondary transfer position 30, the toner image sticks out from the outer edge of the recording medium and is transferred onto the secondary transfer belt 28. At this time, the amount of toner adhering to the secondary transfer belt 28 is remarkably larger than that of the fogging toner in the normal printing mode. In addition, from the non-image area, the fogging toner adheres to the secondary transfer belt 28 in the same manner as in the execution of the normal printing mode M1. Then, the secondary transfer belt 28 is circulatively moved and passes through the position facing the first cleaning member 31 and the second cleaning member 32, while some of the toner is removed by these cleaning members 31 and 32. At this time, the second bias voltage V2 making the potential difference between the first cleaning member 31 and the secondary transfer roller 26 larger than that when the first bias voltage V1 is applied is applied to the first cleaning member 31. The first cleaning member 31 is charged to the positive polarity. Therefore, a large amount of negatively-charged toner adhering to the secondary transfer belt 28 is mainly removed by the first cleaning member 31. The cleaning of the fixing device is executed by the cleaning members 31 and 32. Further, the cleaning members 31 and 32 may be brushes, rollers or blades.

In the case where the borderless printing mode M2 is executed, the toner that sticks out from the outer edge of the recording medium passing through the secondary transfer position 30 and adheres to the secondary transfer belt 28 may adhere to the rear surface of the recording medium if not removed by single cleaning operation, which may cause toner contamination.

Figure 17A:
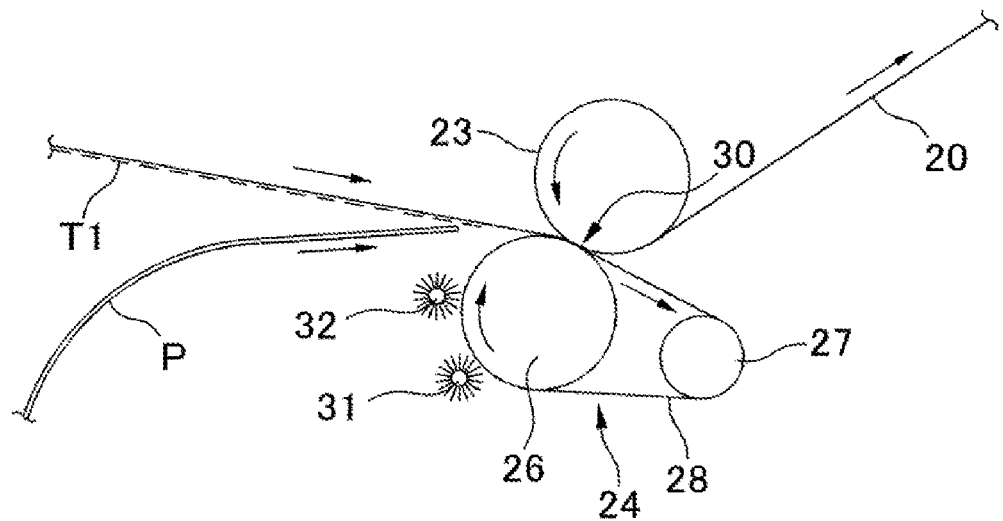
FIGS. 17A to 17C are views for explaining a state in which contamination occurs on a rear surface of a recording medium by a toner image formed to stick out from the recording medium in borderless printing.
Figure 17B:
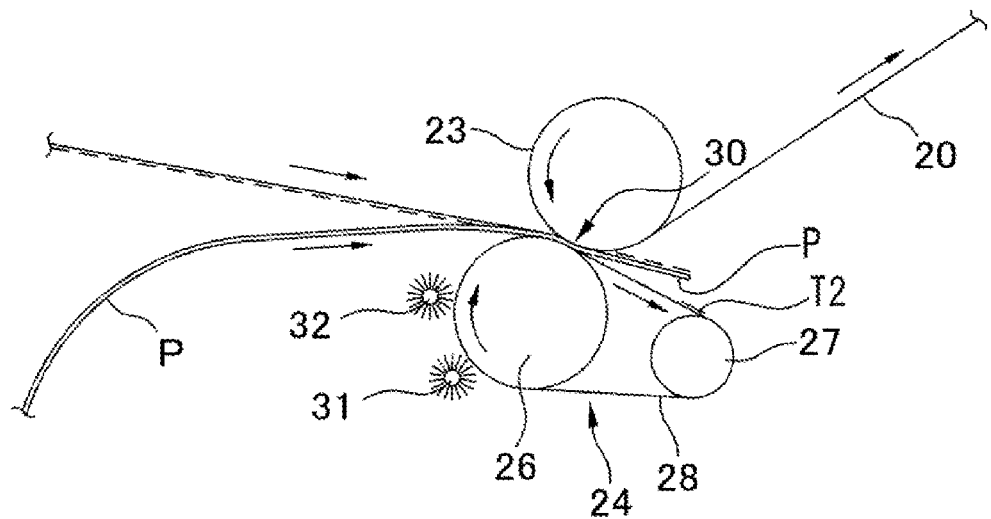
Figure 17C:
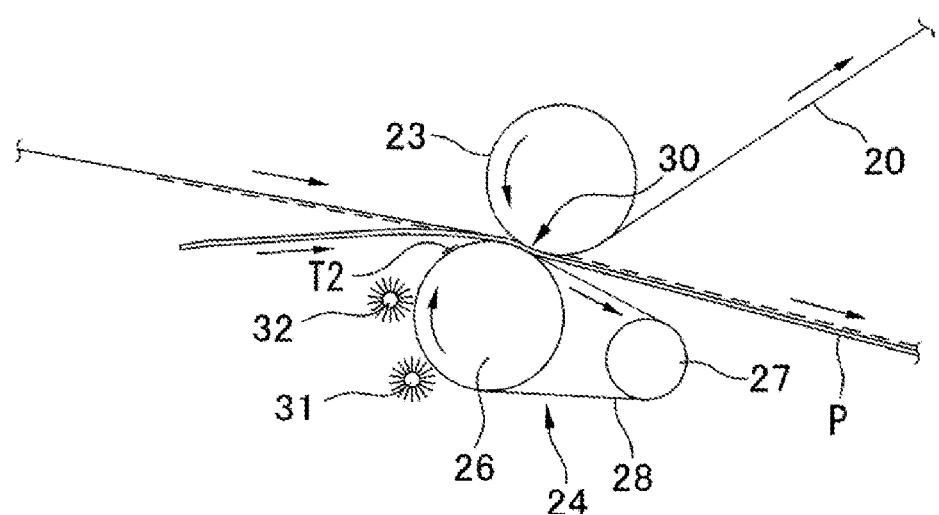

FIGS. 17A to 17C are views for explaining a state in which contamination occurs on the rear surface of a recording medium by a toner image formed to stick out from the recording medium in the borderless printing.

As illustrated in FIG. 17A, when the borderless printing mode M2 is executed, at the secondary transfer position 30 where the toner image is transferred with the recording medium P being sandwiched therebetween, a toner image T1 carried on the intermediate transfer belt 20 is larger than the size of the recording medium P and sticks forward from the leading edge of the recording medium P on the leading end side. When this portion passes through the secondary transfer position 30, the toner image is transferred onto the secondary transfer belt 28 as illustrated in FIG. 17B. Then, as the secondary transfer belt 28 is circulatively driven, the toner passes through the positions facing the first cleaning member 31 and the second cleaning member 32. However, when a toner all of which cannot be removed by these cleaning members 31 and 32 remains, the residual toner T2 reaches the secondary transfer position 30 again. In a case where the circumferential length of the secondary transfer belt 28 is shorter than the length of the recording medium P in the transport direction, as illustrated in FIG. 17C, when the residual toner T2 reaches the secondary transfer position 30, the trailing portion of the recording medium P in the transport direction is still located at the secondary transfer position 30. Thus, the residual toner T2 adheres to the rear surface of the recording medium P.

Therefore, in the case of the borderless printing mode M2, the toner T2 that sticks out from the leading end of the recording medium P and adheres to the secondary transfer belt 28 has to be removed only by passing through the positions facing the first cleaning member 31 and the second cleaning member 32 once to the extent that toner contamination on the rear surface of the recording medium P can be tolerated.

Figure 18:
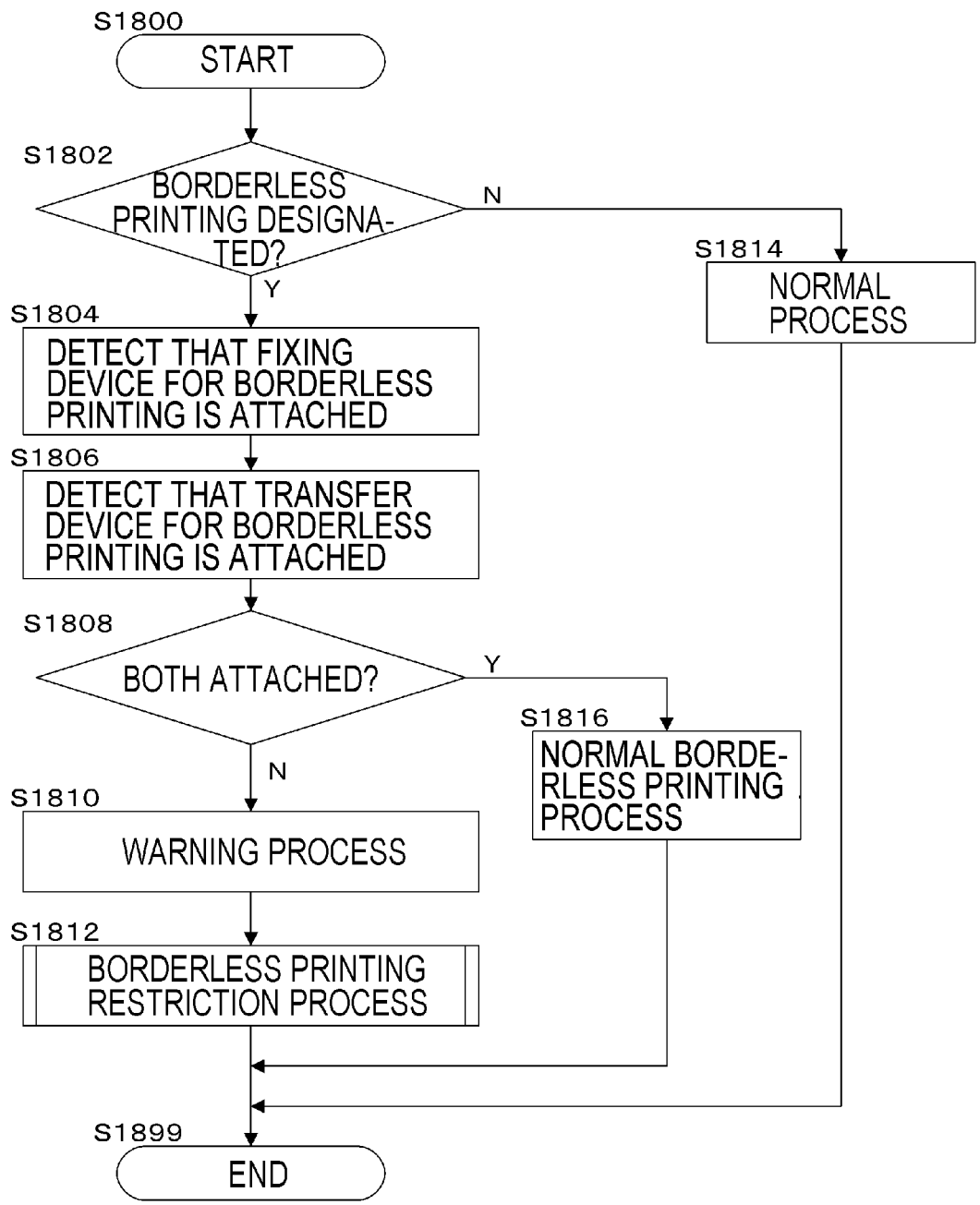
FIG. 18 is a flowchart illustrating an example of a process according to the present exemplary embodiment.

FIG. 18 is a flowchart illustrating an example of a process by the present exemplary embodiment (particularly, the borderless control module 220).

In step S1802, the borderless printing control module 225 determines whether or not borderless printing is designated. When it is determined that the borderless printing is designated, the process proceeds to step S1804. Otherwise, the process proceeds to step S1814.

In step S1804, the borderless printing fixing device detection module 230 detects that a fixing device for borderless printing is attached.

In step S1806, the borderless printing transfer device detection module 235 detects that a transfer device for borderless printing is attached.

In step S1808, the warning module 240 determines whether or not both the fixing device for borderless printing and the transfer device for borderless printing are attached. When it is determined that both are attached, the process proceeds to step S1816. Otherwise, the process proceeds to step S1810.

In step S1810, the warning module 240 executes a warning process.

In step S1812, a borderless printing restriction process is executed. The detailed process of step S1812 will be described later with reference to a flowchart illustrated in an example of FIG. 20.

In step S1814, the image forming processing module 210 executes the normal process. For example, a non-borderless printing process is executed.

In step S1816, the image forming processing module 210 executes the normal borderless printing process described above.

Figure 19A:
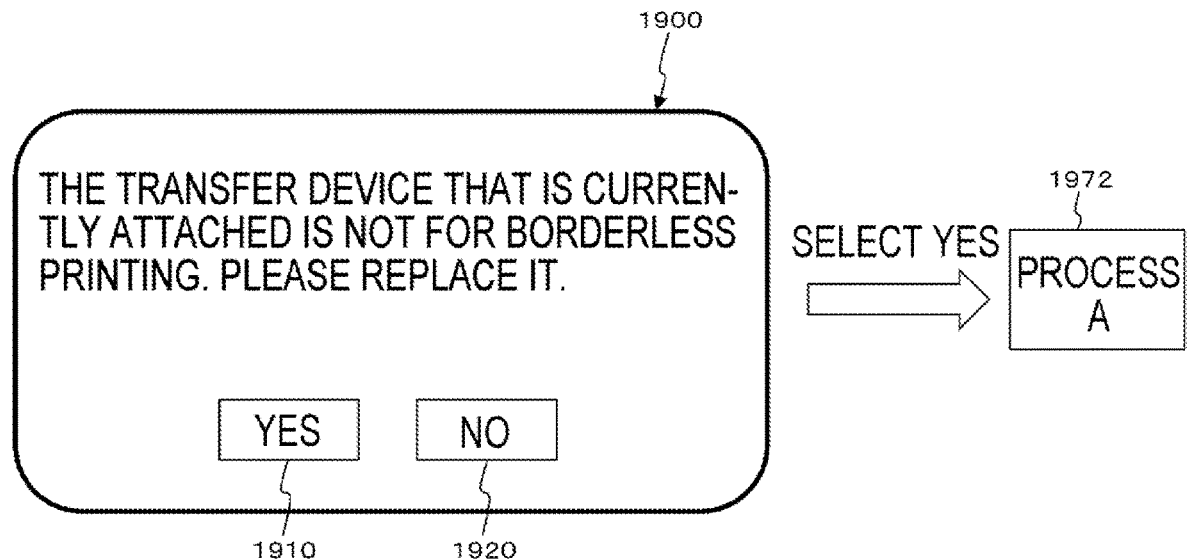
FIGS. 19A and 19B are explanatory views illustrating the example of the process according to the present exemplary embodiment.
Figure 19B:
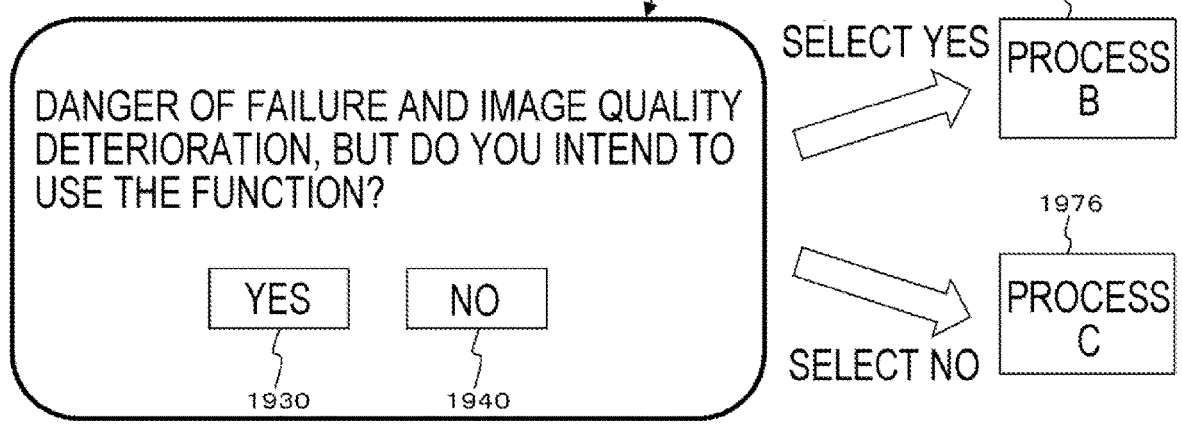

FIGS. 19A and 19B are explanatory views illustrating an example of a process according to the present exemplary embodiment. Particularly, the process example of step S1810 in the flowchart illustrated in the example of FIG. 18 is illustrated.

In the example of FIG. 19A, a message "The transfer device that is currently attached is not for borderless printing. Please replace it" is displayed on a screen 1900 and a Yes button 1910 and a No button 1920 are displayed so as to allow a user to select. Then, when the user selects the Yes button 1910, a process A 1972 is executed. When the No button 1920 is selected, the display illustrated in the example of FIG. 19B is executed.

As the process A 1972, a process of "do not display an error if there is no problem by replacing, or display that it is ready to use and make the function of borderless printing available" is executed. With the flowchart illustrated in the example of FIG. 18, after being determined as "Y" in step S1808, the process of step S1816 is executed.

In the example of FIG. 19B, a message "There are danger of failure and image quality deterioration, but do you intend to use the function?" is displayed on the screen 1900 and a Yes button 1930 and a No button 1940 are displayed so as to allow the user to select. Then, when the user selects the Yes button 1930, a process B 1974 is executed. When the No button 1940 is selected, a process C 1976 is executed.

As the process B 1974, a process of "the function of borderless printing is enabled in a limited manner. As the limited manner, for example, there is a case where the borderless printing is permitted only for this job or that user. Then, when the printing process by the operation by this job or the user is completed, the borderless printing is made unusable" is executed. With the flowchart illustrated in the example of FIG. 18, the process of step S1812 is executed.

As the process C 1976, a process of "return to the home screen. Or display a warning screen again" is executed.

In the case where one of the fixing device for borderless printing and the transfer device for borderless printing is set (the other is not set), the borderless printing may be enabled in the limited manner (the borderless printing is permitted). When both are not set, the borderless printing may be prohibited.

Figure 20:
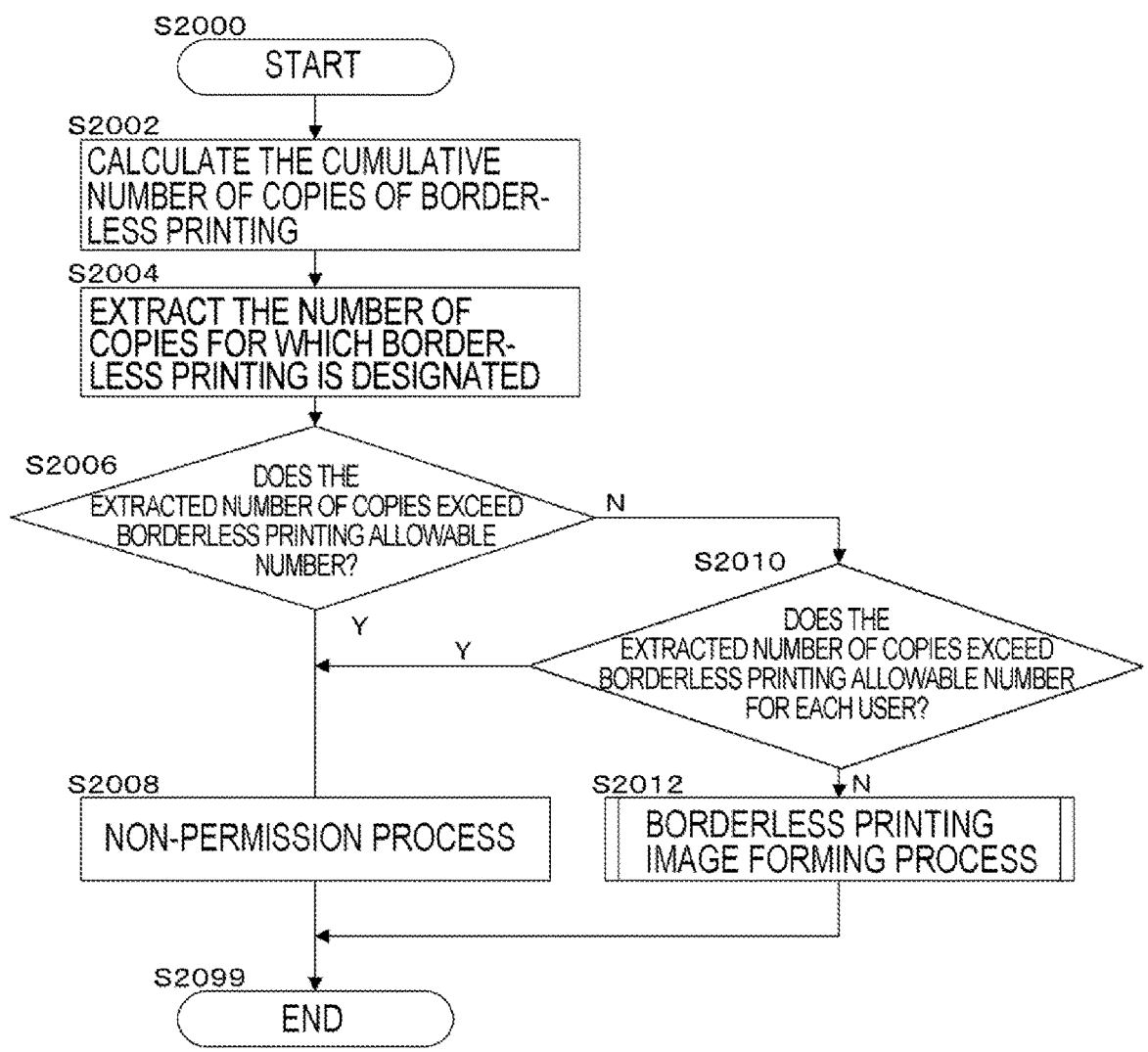
FIG. 20 is a flowchart illustrating an example of a process according to the present exemplary embodiment.

FIG. 20 is a flowchart illustrating an example of a process according to the present exemplary embodiment.

Figure 21:
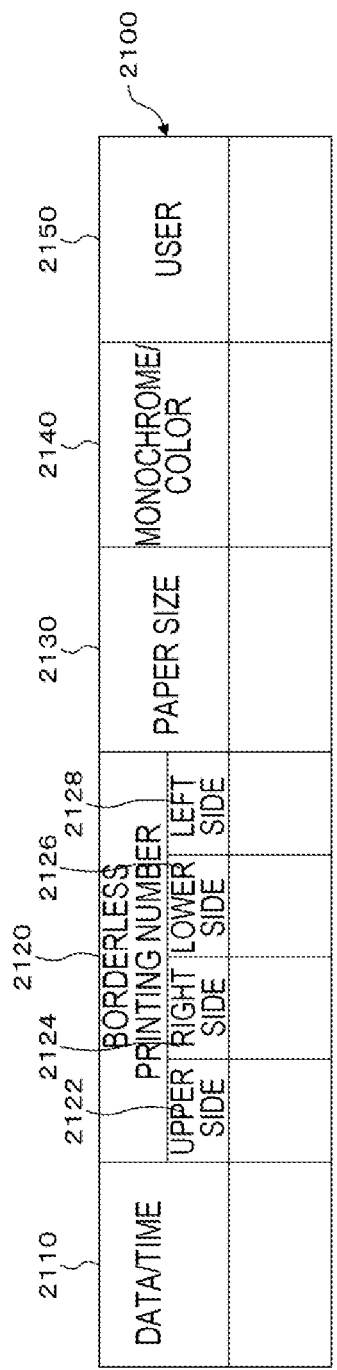
FIG. 21 is an explanatory view illustrating an example of a data structure of a borderless printing log table.

In step S2002, the cumulative number of copies of the borderless printing is calculated. As described above, the cumulative number of copies may be calculated for each user, each paper size or the like. For example, it may be calculated using a borderless printing log table 2100. FIG. 21 is an explanatory view illustrating an example of the data structure of the borderless printing log table 2100. The borderless printing log table 2100 has a date/time field 2110, a borderless printing number field 2120, a paper size field 2130, a monochrome/color field 2140 and a user field 2150. The borderless printing log table 2100 stores a history (log) of the borderless printing in a state in which a fixing device for borderless printing or a transfer device for borderless printing is not set. The borderless printing number field 2120 has an upper side field 2122, a right side field 2124, a lower side field 2126 and a left side field 2128. The date/time field 2110 stores date and time when the borderless printing is executed. The borderless printing number field 2120 stores the number of copies of the borderless printing. The upper side field 2122 stores the number of copies of the borderless printing on the upper side. The right side field 2124 stores the number of copies of the borderless printing on the right side. The lower side field 2126 stores the number of copies of the borderless printing on the lower side. The left side field 2128 stores the number of copies of the borderless printing on the left side. As a matter of course, it is also possible to store the number of copies of the borderless printing on the entire paper, not for each side (the number of copies counted as the borderless printing in the case of executing the borderless printing even on one side). The paper size field 2130 stores the paper size in the borderless printing. The monochrome/color field 2140 stores information indicating whether the borderless printing is monochrome printing or color printing. The user field 2150 stores a user (user ID) who executes the borderless printing.

In step S2004, the number of copies for which the borderless printing is designated is extracted. In this process, the number of copies may be counted for each side.

In step S2006, it is determined whether or not the extracted number of copies exceeds the borderless printing allowable number of copies. When it is determined that it exceeds the allowable number of copies, the process proceeds to step S2008. Otherwise, the process proceeds to step S2010. In the image forming device 200, the preset number of copies (the number of copies that can be borderless-printed in a state in which the fixing device for borderless printing or the transfer device for borderless printing is not set) is set as a threshold value. This process may be executed for each side.

In step S2008, a non-permission process is executed. For example, a message indicating that borderless printing cannot be executed is displayed.

Figure 22:
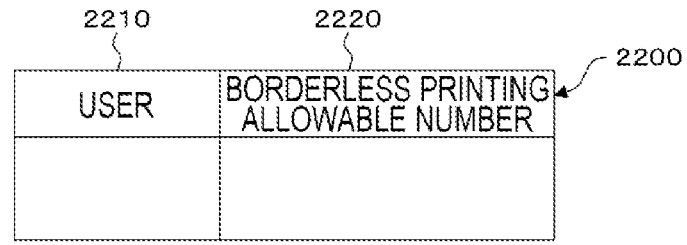
FIG. 22 is an explanatory view illustrating an example of a data structure of a per-user allowable number table.

In step S2010, it is determined whether or not the extracted number of copies exceeds the borderless printing allowable number of copies for each user. When it is determined that it exceeds the allowable number of copies, the process proceeds to step S2008. Otherwise, the process proceeds to step S2012. For example, the allowable number of copies may be determined using a per-user allowable number table 2200. FIG. 22 is an explanatory view illustrating an example of the data structure of the per-user allowable number table 2200. The per-user allowable number table 2200 has a user field 2210 and a borderless printing allowable number field 2220. The user field 2210 stores a user. The borderless printing allowable number field 2220 stores the borderless printing allowable number of copies for the user. In this example, the allowable number of copies is set for each user. Alternatively, the allowable number of copies may be set for each paper size or the like.

When the borderless printing can be designated for each side, the borderless printing allowable number field 2220 may be the number of sides that can be borderless-printed. Furthermore, the borderless printing allowable number field 2220 may be the number of sides that can be borderless-printed for each of the upper side, the right side, the lower side and the left side. Then, the process of step S2010 may be executed for each side.

In step S2012, a borderless printing image forming process is performed. The detailed process of step S2012 will be described later with reference to a flowchart illustrated in an example of FIG. 23.

Figure 23:
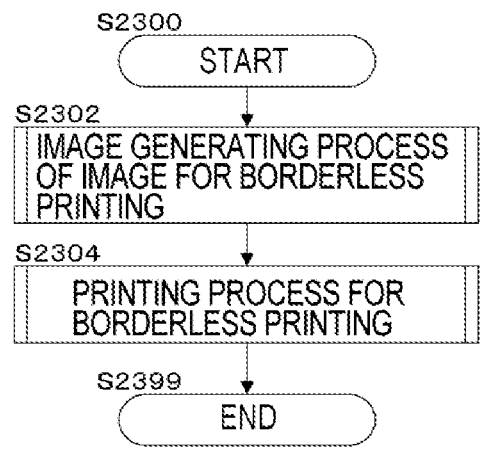
FIG. 23 is a flowchart illustrating an example of a process according to the present exemplary embodiment.

FIG. 23 is a flowchart illustrating an example of a process according to the present exemplary embodiment.

In step S2302, an image generating process of an image for borderless printing is executed. The detailed process of step S2302 will be described later with reference to a flowchart illustrated in an example of FIG. 24.

In step S2304, a printing process for borderless printing is executed. The detailed process of step S2304 will be described later with reference to a flowchart illustrated in an example of FIG. 25.

Figure 24:
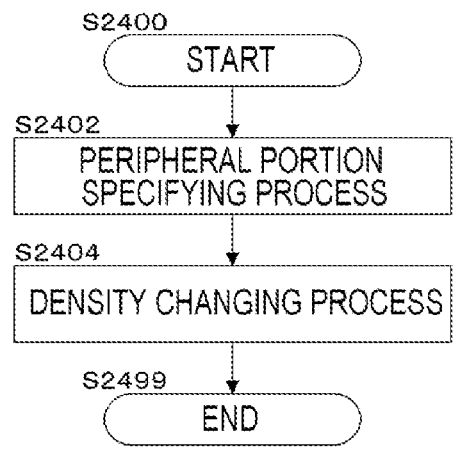
FIG. 24 is a flowchart illustrating an example of a process according to the present exemplary embodiment.

FIG. 24 is a flowchart illustrating an example of a process according to the present exemplary embodiment.

In step S2402, a peripheral portion specifying process is executed. For example, a predetermined area (a portion having a predetermined width from an edge) is specified.

In step S2404, a density changing process is executed. For example, rather than uniformly lowering the density of the peripheral portion, the amount of lowered density may be increased toward the edge.

Figure 25:
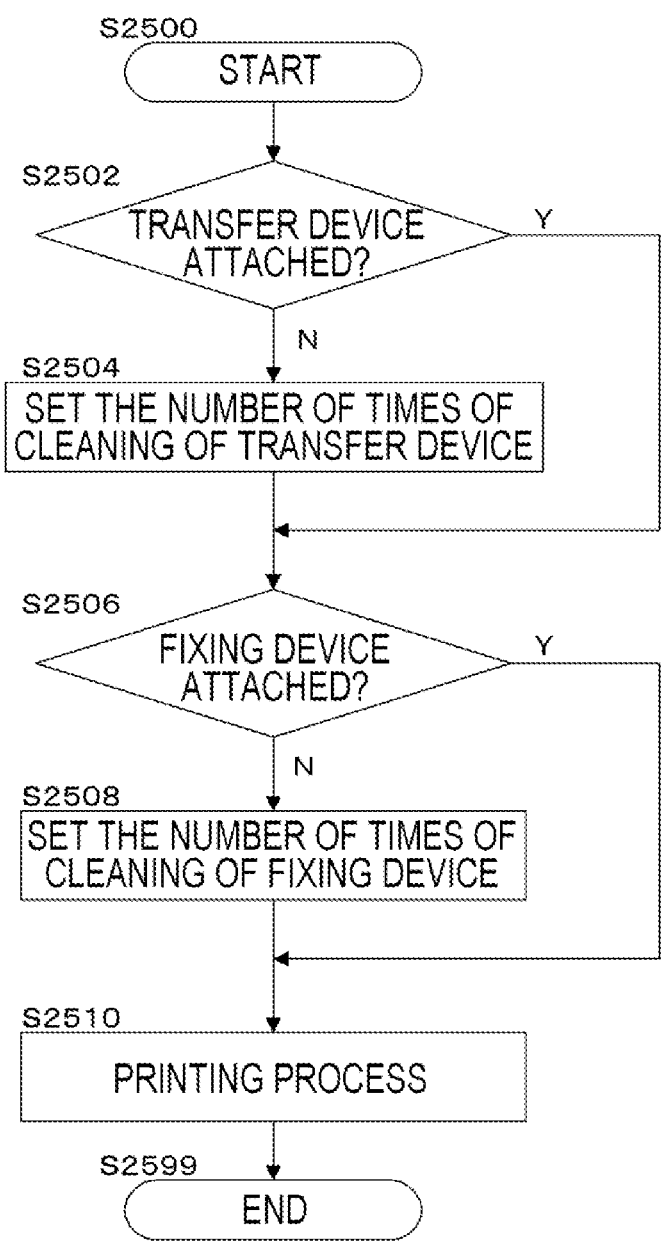
FIG. 25 is a flowchart illustrating an example of a process according to the present exemplary embodiment.

FIG. 25 is a flowchart illustrating an example of a process according to the present exemplary embodiment.

In step S2502, it is determined whether or not a transfer device is attached. When it is determined that a transfer device is not attached, the process proceeds to step S2504. Otherwise, the process proceeds to step S2506.

In step S2504, the number of times of cleaning of the transfer device is set.

In step S2506, it is determined whether or not a fixing device is attached. When it is determined that a fixing device is not attached, the process proceeds to step S2508. Otherwise, the process proceeds to step S2510.

In step S2508, the number of times of cleaning of the fixing device is set.

In step S2510, a borderless printing process is executed.

Figure 26:
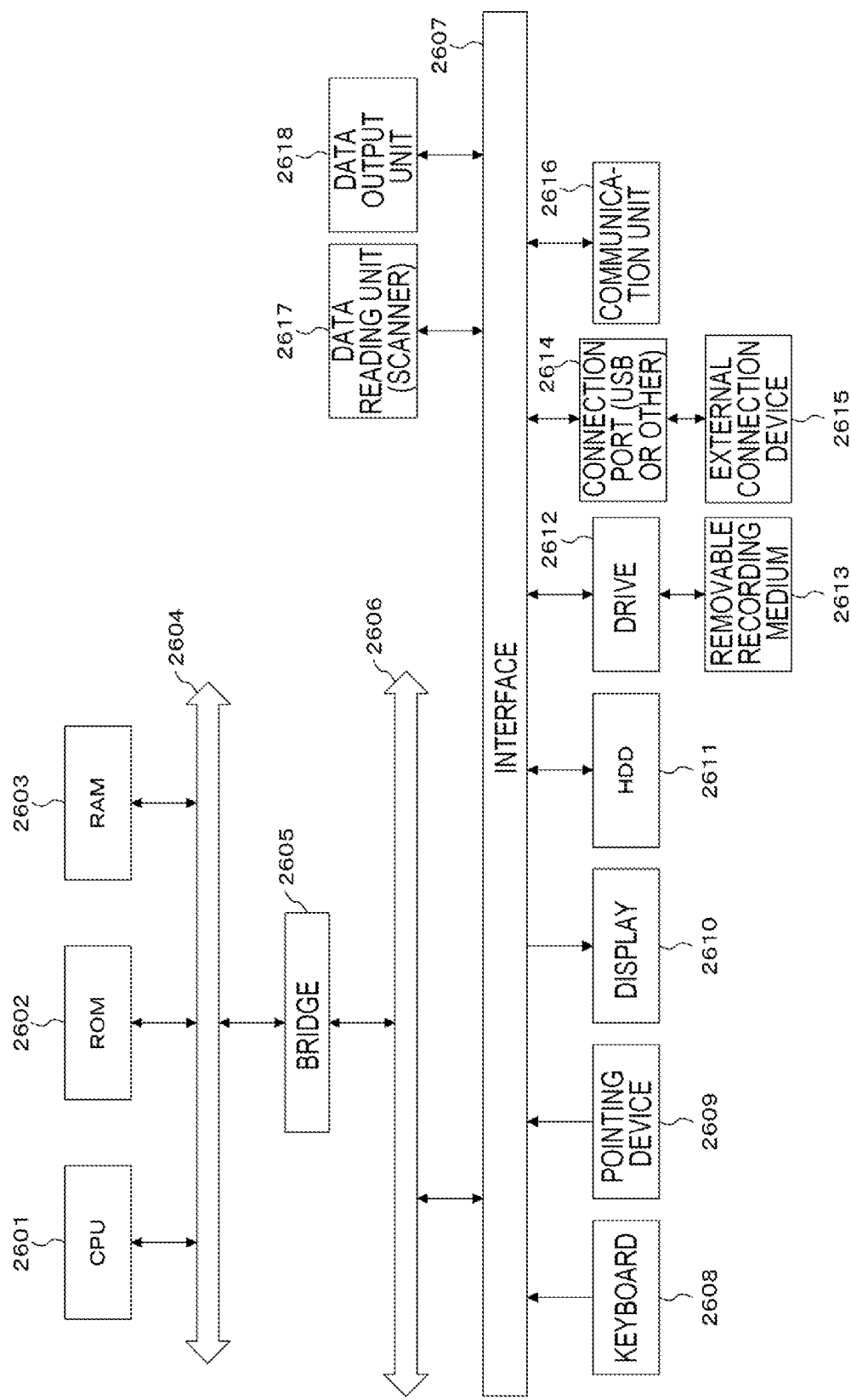
FIG. 26 is a block diagram illustrating an example of the hardware configuration of a computer that implements the present exemplary embodiment.

A hardware configuration example of the image forming instruction device 100 and the image forming device 200 of the present exemplary embodiment will be described with reference to FIG. 26. The configuration illustrated in FIG. 26 is implemented by, for example, a personal computer (PC) or the like. FIG. 26 illustrates a hardware configuration including a data reading unit 2617 such as a scanner and a data output unit 2618 such as a printer.

A CPU (Central Processing Unit) 2601 is a control unit that executes a process according to a computer program describing the execution sequence of various modules described in the above exemplary embodiment, including the print data reception module 105, the print attribute setting module 110, the outer edge checking module 115, the image generating process detection module 120, the selection module 125, the presentation module 130, the print instruction module 135, the control module 12, the borderless printing control module 225, the borderless printing fixing device detection module 230, the borderless printing transfer device detection module 235, the warning module 240, the borderless image forming processing module 245, the print restriction processing module 250, the borderless printing software checking module 255, the borderless printing software introduction module 260, the communication module 265, etc.

A ROM (Read Only Memory) 2602 stores programs, operation parameters and the like used by the CPU 2601. A RAM (Random Access Memory) 2603 stores programs to be used in the execution by the CPU 2601, parameters appropriately changing in the execution thereof, and the like. The CPU 2601, the ROM 2602 and the RAM 2603 are interconnected by a host bus 2604 configured with a CPU bus or the like.

The host bus 2604 is connected to an external bus 2606 such as a PCI (Peripheral Component Interconnect/Interface) bus via a bridge 2605.

A keyboard 2608 and a pointing device 2609 such as a mouse are devices operated by an operator. A display 2610 includes a liquid crystal display device, a CRT (Cathode Ray Tube) and the like, and displays various information as text or image information. Further, a touch screen or the like having both functions of the pointing device 2609 and the display 2610 may be provided. In that case, in order to implement the keyboard function, a keyboard (so-called software keyboard, screen keyboard or the like) may be drawn by software on a screen (touch screen) without being physically connected, unlike the keyboard 2608.

An HDD (Hard Disk Drive) 2611 contains a hard disk (or a flash memory or the like) and drives the hard disk to record or reproduce programs and information to be executed by the CPU 2601. The hard disk stores print data, the print instruction table 800, the borderless printing log table 2100, the per-user allowable number table 2200 and the like. Furthermore, the hard disk stores various other data, various computer programs, etc.

A drive 2612 reads data or programs recorded on a removable recording medium 2613 such as a magnetic disk, an optical disc, a magneto-optical disc, a semiconductor memory or the like mounted thereon, and supplies the data or programs to the RAM 2603 connected via the interface 2607, the external bus 2606, the bridge 2605 and the host bus 2604. The removable recording medium 2613 can also be used as a data recording area.

A connection port 2614 is a port for connecting an external connection device 2615 and has a connector such as USB, IEEE 1394 or the like. The connection port 2614 is connected to the CPU 2601 and the like via the interface 2607, the external bus 2606, the bridge 2605, the host bus 2604 and the like. A communication unit 2616 is connected to a communication line and executes a data communication process with the outside. A data reading unit 2617 is, for example, a scanner, and executes a document reading process. A data output unit 2618 is, for example, a printer, and executes a document data output process.

The hardware configuration of the image forming instruction device 100 and the image forming device 200 illustrated in FIG. 26 is just illustrative. The exemplary embodiment is not limited to the configuration illustrated in FIG. 26 but may have any configuration as long as the modules described in the present exemplary embodiment can be executed. For example, some modules may be implemented by dedicated hardware (e.g., ASIC (Application Specific Integrated Circuit), etc.), and some modules may be disposed in an external system and connected via a communication line. Further, plural systems illustrated in FIG. 26 may be interconnected via a communication line to cooperate with each other.

Further, they may be incorporated in a portable information communication device (including a mobile phone, a smart phone, a mobile device, a wearable computer, etc.), an information appliance, a robot, a copying machine, a facsimile, a scanner, a printer, a multifunction machine or the like in addition to the personal computer.

Although an image forming device for forming a color image using toner of four colors has been illustrated in the exemplary embodiment, it may be an image forming device for monochrome printing or an image forming device for forming a color image using toner of three or five or more colors.

In addition, although an example using plural photoconductor drums has been illustrated, it is also possible to form an image on one photoconductor drum.

The program described above may be stored in a recording medium or may be provided by a communication unit. In that case, for example, the program described above may be grasped as an invention of "a computer-readable recording medium storing a program."

The "computer-readable recording medium storing a program" refers to a computer-readable recording medium in which a program is recorded and which is used for installation, execution, distribution and so on of programs.

Examples of the recording medium may include a digital versatile disc (DVD) such as "DVD-R, DVD-RW, DVD-RAM, etc.," which are standards formulated by the DVD forum, "DVD+R, DVD+TW, etc.," which are standards formulated by DVD+RW, a compact disc (CD) such as CD-ROM, CD recordable (CD-R), CD rewritable (CD-RW) and the like, a Blu-ray® disc, a magneto-optical disk (MO), a flexible disk (FD), a magnetic tape, a hard disk, a read only memory (ROM), an electrically erasable and rewritable read only memory (EEPROM®), a flash memory, a random access memory (RAM), a SD (Secure Digital) memory card, and the like.

The whole or part of the above-described program may be recorded in the recording medium for storage, distribution and the like. Further, the whole or part of the above-described program may be transmitted by communications using transmission media such as a wired network, a wireless communication network or a combination thereof used for a local area network (LAN), a metropolitan area network (MAN), a wide area network (WAN), the Internet, an intranet, an extranet and the like, or may be carried on a carrier wave.

Furthermore, the above-described program may be a part or the whole of another program, or may be recorded on a recording medium together with a separate program. Further, it may be divided and recorded in plural recording media. Further, it may be recorded in any manner as long as it can be compressed or coded in a restorable manner.

The exemplary embodiment may be used in combination with the following image forming devices. (a) An image forming device including:

an image carrier that carries a toner image;

a transfer member disposed such that a circulatively-moving endless peripheral surface faces the image carrier, an electric field being formed between the image carrier and the transfer member, the electric field that transfers the toner image onto a recording medium passing between the image carrier and the transfer member;

a cleaning member disposed to contact the peripheral surface of the transfer member, the cleaning member that removes a toner adhering to the surface of the transfer member;

a cleaning bias applying unit that applies a cleaning bias voltage between the cleaning member and the transfer member;

a printing mode switching unit that selects and switches one of plural printing modes including a borderless printing mode in which the toner image is transferred onto the entire surface of the recording medium and a normal printing mode in which the toner image is transferred while leaving a margin on an outer peripheral portion of the recording medium; and a bias voltage controller that controls such that the cleaning bias voltage applied by the cleaning bias applying unit is set to a first bias voltage in the normal printing mode and is set to a second bias voltage in the borderless printing mode, the second bias voltage making a potential difference between the cleaning member and the transfer member larger than that when the first bias voltage is applied, wherein when the formation of the image in the borderless printing mode is continuously executed, plural borderless images are formed until a predetermined condition is met, and then the second bias voltage applied between the cleaning member and the transfer member is switched to the first bias voltage so that the peripheral surface of the transfer member is circulatively driven in a state where the first bias voltage is applied.

(b) The image forming device according to (a), wherein when the formation of the image in the borderless printing mode is continuously executed, the second bias voltage is switched to the first bias voltage so that the peripheral surface of the transfer member is circulatively driven in the state where the first bias voltage is applied, and then the first bias voltage is switched to the second bias voltage so that the formation of the image in the borderless printing mode is resumed.

The above configuration achieves the following effects.

In the image forming device of item (a), as compared with a device not equipped with this configuration, even when the formation of the image in the borderless printing mode is continuously executed, it is possible to prevent the rear surface of the recording medium onto which the toner image is transferred from being contaminated by toner.

In the image forming device of item (b), as compared with a device not equipped with this configuration, even when the formation of the image in the borderless printing mode is continuously executed, it is possible to prevent the rear surface of the recording medium onto which the toner image is transferred from being contaminated by toner.

Further, the above-described exemplary embodiment may be grasped as follows.

[A1] An image forming device in which a fixing device or a transfer device is replaceable, the image forming device including a warning unit that issues a warning when a borderless printing function is used and when the fixing device or the transfer device is not for borderless printing.

[A2] The image forming device according to [A1], wherein the use of the borderless printing function is restricted when the warning is issued.

[A3] The image forming device according to [A2], wherein the restriction on the use of the borderless printing function is a restriction on the number of times of use or a restriction on a user.

[A4] An image forming device including an image forming processing unit that, when a fixing unit for borderless printing or a transfer unit for borderless printing is not attached and when a designation of a borderless printing function is received, performs another image forming process different from that in a case where the fixing device for borderless printing and the transfer device for borderless printing are attached.

[A5] The image forming device according to [A4], wherein the other image forming process lowers a density of an image of a peripheral portion which is an edge.

[A6] The image forming device according to [A4], wherein the other image forming process executes cleaning of the transfer device or the fixing device more frequently than in the case where the fixing device for borderless printing and the transfer device for borderless printing are mounted.

[A7] The image forming device according to any one of [A1] to [A6], further including a checking unit that checks whether or not software capable of using the borderless printing is introduced, when a fixing device for borderless printing and a transfer device for borderless printing are attached.

[A8] The image forming device according to [A7], further including an introduction unit that, when the software capable of using the borderless printing is not introduced, introduces the software via a communication line.

[A9] A non-transitory computer readable medium storing a program that causes a computer in an image forming device in which a fixing device or a transfer device is replaceable to perform an image forming process, the process including issuing a warning when a borderless printing function is used and when the fixing device or the transfer device is not for borderless printing.

[A10] A non-transitory computer readable medium storing a program that causes a computer to perform an image forming process, the process including when a fixing unit for borderless printing or a transfer unit for borderless printing is not attached and when a designation of a borderless printing function is received, performing another image forming process different from that in a case where the fixing device for borderless printing and the transfer device for borderless printing are attached.

The above-described aspects have the following effects.

With the image forming device of [A1], when the transfer device and the fixing device suitable which are for borderless printing are not attached, it is possible to notify the fact to a user.

With the image forming device of [A2], in a case where the fixing device is not for borderless printing or the transfer device is not for borderless printing, the use of the borderless printing function can be restricted.

With the image forming device of [A3], the use of borderless printing can be restricted according to the number of times of use or a user.

With the image forming device of [A4], it is possible to prevent deterioration in image quality, failure, etc. due to the borderless printing.

With the image forming device of [A5], it is possible to reduce the load of cleaning.

With the image forming device of [A6], it is possible to reduce a cleaning leakage due to the borderless printing.

With the image forming device of [A7], it is possible to prevent software capable of using the borderless printing from not being introduced even though the fixing device for borderless printing and the transfer device for borderless printing are attached.

With the image forming device of [A8], when the fixing device for borderless printing and the transfer device for borderless printing are attached, it is possible to introduce software capable of using the borderless printing.

With the information processing program of [A9], when a transfer device and a fixing device which are suitable for borderless printing are not attached, it is possible to notify the fact to a user.

With the non-transitory computer readable medium of [A10], it is possible to prevent deterioration in image quality, failure, etc. due to the borderless printing.

Further, the above-described exemplary embodiment may be grasped as follows.

[B1] An image forming device in which a fixing device or a transfer device is replaceable, the image forming device including a warning unit that issues a warning when a borderless printing function is used and when the fixing device or the transfer device is not for borderless printing, wherein when the warning is issued, the number of times of use of the borderless printing function or a user is restricted.

[B2] An image forming device including an image forming processing unit that, when a fixing device for borderless printing or a transfer device for borderless printing is not attached thereto and when a designation of a borderless printing function is received, performs another image forming process different from that in a case where the fixing device for borderless printing and the transfer device for borderless printing are attached.

[B3] The image forming device according to [B2], wherein the other image forming process lowers the density of an image of a peripheral portion which is an edge.

[B4] The image forming device according to [B2], wherein the other image forming process executes cleaning of the transfer device or the fixing device more frequently than in the case where the fixing device for borderless printing and the transfer device for borderless printing are mounted.

[B5] The image forming device according to any one of [B1] to [B4], further including a checking unit that checks whether or not software capable of using borderless printing is introduced, when the fixing device for borderless printing and the transfer device for borderless printing are attached.

[B6] The image forming device according to [B5], further including an introduction unit that, when the software capable of using the borderless printing is not introduced, introduces the software via a communication line.

[B7] A non-transitory computer readable medium storing a program that causes a computer in an image forming device to perform an image forming process, the process including issuing a warning when a borderless printing function is used and when the fixing device or the transfer device is not for borderless printing, wherein when the warning is issued, the number of times of use of the borderless printing function or a user is restricted.

[B8] A non-transitory computer readable medium storing a program that causes a computer in an image forming device to perform an image forming process, the process including when a fixing device for borderless printing or a transfer device for borderless printing is not attached and when a designation of a borderless printing function is received, performing another image forming process different from that in a case where the fixing device for borderless printing and the transfer device for borderless printing are attached.

The above-described aspects have the following effects.

With the image forming device of [B1], when a transfer device and a fixing device which are suitable for borderless printing are not attached, it is possible to notify the fact to a user. In addition, the use of the borderless printing can be restricted according to the number of times of use or a user.

With the image forming device of [B2], it is possible to prevent deterioration in image quality, failure, etc. due to the borderless printing.

With the image forming device of [B3], it is possible to reduce the load of cleaning.

With the image forming device of [B4], it is possible to reduce a cleaning leakage due to the borderless printing.

With the image forming device of [B5], it is possible to prevent software capable of using the borderless printing from not being introduced even though a fixing device for borderless printing and a transfer device for borderless printing are attached.

With the image forming device of [B6], when a fixing device for borderless printing and a transfer device for borderless printing are attached, it is possible to introduce software capable of using borderless printing.

With the non-transitory computer readable medium of [B7], when a transfer device and a fixing device which are suitable for borderless printing are not attached, it is possible to notify the fact to a user. In addition, the use of the borderless printing can be restricted according to the number of times of use or a user.

With the non-transitory computer readable medium of [B8], it is possible to prevent a deterioration in image quality, failure, etc. due to borderless printing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming instruction device comprising:
a processor, configured to execute a selection module and an outer edge checking module,
wherein the selection module selects either a setting for borderless printing or a setting for non-borderless printing based on that print data is an image generated by taking a screenshot,
wherein if the print data is the image generated by taking the screenshot, the selection module selects the setting for borderless printing,
wherein if the print data is not the image generated by taking the screenshot, the outer edge checking module detects an image on an outer edge of print data for each edge of the print data and outputs a detection result to the selection module,
wherein the selection module selects either a setting for borderless printing or a setting for non-borderless printing, for each edge of the print data.

2. The image forming instruction device according to claim 1, further comprising:
a generator that generates an image having a leading edge that is set to the setting for non-borderless printing when the setting for borderless printing and the setting for non-borderless printing are mixed in the print data.

3. The image forming instruction device according to claim 2, wherein the generator generates the image having the leading edge that is set to the setting for non-borderless printing, by rotating the print data.

4. A non-transitory computer readable medium storing a program that causes a computer to execute an image forming instruction process, the image forming instruction process comprising:
selecting either a setting for borderless printing or a setting for non-borderless printing based on that print data is an image generated by taking a screenshot,
if the print data is the image generated by taking the screenshot, selecting the setting for borderless printing, and
if the print data is not the image generated by taking the screenshot, the image forming instruction process further comprising:
detecting an image on an outer edge of print data;
outputting a detection result; and
selecting either the setting for borderless printing or the setting for non-borderless printing based on the detection result.

5. An image forming instruction device comprising:
a processor, configured to execute a selection module and an outer edge checking module,
wherein the selection module selects either a setting for borderless printing or a setting for non-borderless printing based on that print data is an image generated by taking a screenshot, wherein
if the print data is the image generated by taking the screenshot, the selection module selects the setting for borderless printing, and
if the print data is not the image generated by taking the screenshot, the outer edge checking module detects an image on an outer edge of the print data, the outer edge checking module outputs a detection result to the selection module, and the selection module selects either the setting for borderless printing or the setting for non-borderless printing based on the detection.

6. The image forming instruction device according to claim 5, wherein the selection module selects the setting for borderless printing when there is an image on the outer edge of the print data.

7. The image forming instruction device according to claim 5, wherein the selection module selects the setting for non-borderless printing when there is no image on the outer edge of the print data.

8. The image forming instruction device according to claim 5, wherein the selection module further selects either the setting for borderless printing or the setting for non-borderless printing based on a generating process of the print data.

9. The image forming instruction device according to claim 8, wherein the selection module selects the setting for borderless printing when the print data is an image generated by taking a screenshot.

10. The image forming instruction device according to claim 5, further comprising:
a presentation unit that presents a selection result obtained by the selection module.

11. The image forming instruction device according to claim 10, wherein the presentation unit presents the selection result so as to be changeable by an operator.

12. An image forming instruction method comprising:
selecting either a setting for borderless printing or a setting for non-borderless printing based on that print data is an image generated by taking a screenshot,
if the print data is the image generated by taking the screenshot, selecting the setting for borderless printing, and
if the print data is not the image generated by taking the screenshot, the method further comprising:
detecting an image on an outer edge of print data;
outputting a detection result; and
selecting either the setting for borderless printing or the setting for non-borderless printing based on the detection.

* * * * *